United States Patent
Pathak et al.

(10) Patent No.: US 11,803,546 B2
(45) Date of Patent: Oct. 31, 2023

(54) SELECTING INTERRUPTIBLE RESOURCES FOR QUERY EXECUTION

(71) Applicant: Amazon Technologies, Inc., Seattle, WA (US)

(72) Inventors: Rahul Sharma Pathak, Seattle, WA (US); Jason Douglas Denton, Seattle, WA (US); Abhishek Rajnikant Sinha, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 495 days.

(21) Appl. No.: 15/588,373

(22) Filed: May 5, 2017

(65) Prior Publication Data

US 2018/0060395 A1 Mar. 1, 2018

Related U.S. Application Data

(60) Provisional application No. 62/382,477, filed on Sep. 1, 2016.

(51) Int. Cl.
*G06F 16/2453* (2019.01)
*G06F 16/2458* (2019.01)
(Continued)

(52) U.S. Cl.
CPC .......... *G06F 16/24545* (2019.01); *G06F 9/50* (2013.01); *G06F 9/505* (2013.01);
(Continued)

(58) Field of Classification Search
CPC ................. G06F 17/30557; G06F 9/50; G06F 17/30575; G06F 17/30286;
(Continued)

(56) References Cited

U.S. PATENT DOCUMENTS 6,216,109 B1   4/2001 Zweben
6,859,926 B1   2/2005 Brenner et al.
(Continued)

FOREIGN PATENT DOCUMENTS

EP   2778967       9/2014
JP   2012058815    3/2012
(Continued)

OTHER PUBLICATIONS

Peng et al. "Modeling of Concurrent Task Execution in a Distributed System for Real-Time Control" IEEE Transactions on Computers, vol. C-36, No. 4 Apr. 1987 (Year: 1987).*
(Continued)

*Primary Examiner* — Vaishali Shah
*Assistant Examiner* — Berhanu Mitiku
(74) *Attorney, Agent, or Firm* — S. Scott Foster; Kowert, Hood, Munyon, Rankin & Goetzel, P.C.

(57) ABSTRACT

Interruptible computing resources for executing queries may be selected. When queries are received, the probability that query can complete execution at interruptible computing resources may be determined. Computing resources to process the query may be selected based on the probability. For queries that are performed on computing resources that are interrupted, interruption handling techniques may retry the query on other computing resources or complete the query on other computing resources, in some embodiments.

20 Claims, 19 Drawing Sheets

(51) Int. Cl.

| | | |
|---|---|---|
| *G06F 16/27* | (2019.01) | |
| *G06F 16/2455* | (2019.01) | |
| *G06F 16/903* | (2019.01) | |
| *G06F 16/25* | (2019.01) | |
| *G06F 16/21* | (2019.01) | |
| *G06F 16/248* | (2019.01) | |
| *G06F 16/28* | (2019.01) | |
| *G06F 9/50* | (2006.01) | |
| *G06F 16/20* | (2019.01) | |
| *H04L 67/1008* | (2022.01) | |
| *H04L 67/1029* | (2022.01) | |
| *H04L 67/10* | (2022.01) | |
| *H04L 67/1031* | (2022.01) | |
| *G06F 16/245* | (2019.01) | |

(52) U.S. Cl.
CPC .......... *G06F 9/5022* (2013.01); *G06F 9/5044* (2013.01); *G06F 9/5055* (2013.01); *G06F 9/5061* (2013.01); *G06F 9/5088* (2013.01); *G06F 16/20* (2019.01); *G06F 16/211* (2019.01); *G06F 16/248* (2019.01); *G06F 16/2455* (2019.01); *G06F 16/2471* (2019.01); *G06F 16/24549* (2019.01); *G06F 16/24553* (2019.01); *G06F 16/25* (2019.01); *G06F 16/27* (2019.01); *G06F 16/282* (2019.01); *G06F 16/90335* (2019.01); *H04L 67/10* (2013.01); *H04L 67/1008* (2013.01); *H04L 67/1029* (2013.01); *H04L 67/1031* (2013.01); *G06F 9/5027* (2013.01); *G06F 16/245* (2019.01); *G06F 2209/501* (2013.01); *G06F 2209/503* (2013.01); *G06F 2209/508* (2013.01); *G06F 2209/5011* (2013.01)

(58) Field of Classification Search
CPC ............. G06F 17/30283; G06F 9/5038; G06F 17/30442; G06F 16/24545; G06F 16/2471; G06F 16/27; G06F 16/24553; G06F 16/90335; G06F 16/24549; G06F 16/2455; G06F 16/282; G06F 16/211; G06F 16/25; G06F 16/248; G06F 16/245; G06F 16/2453; G06F 16/24532; G06F 16/2465; G06F 16/3338; G06F 16/24542; G06F 16/338; G06F 16/242; G06F 16/24568; G06F 16/3331; G06F 16/3346; G06F 9/5055

See application file for complete search history.

(56) References Cited

U.S. PATENT DOCUMENTS

| | | |
|---|---|---|
| 7,243,093 B2 | 7/2007 | Cragun et al. |
| 7,613,742 B2 | 11/2009 | Bohannon et al. |
| 8,429,096 B1* | 4/2013 | Soundararajan ...... G06F 9/5005 706/12 |
| 8,429,097 B1 | 4/2013 | Sivasubramanian et al. |
| 8,676,622 B1 | 3/2014 | Ward, Jr. et al. |
| 8,775,282 B1* | 7/2014 | Ward, Jr. ............ H04L 41/0896 709/224 |
| 8,881,142 B1 | 11/2014 | Reid et al. |
| 8,977,600 B2 | 3/2015 | Crupi et al. |
| 9,208,032 B1 | 12/2015 | McAlister et al. |
| 9,240,025 B1 | 1/2016 | Ward, Jr. et al. |
| 9,294,236 B1 | 3/2016 | Ward, Jr. |
| 10,762,086 B2 | 9/2020 | Wu et al. |
| 2004/0205759 A1 | 10/2004 | Oka |
| 2007/0083648 A1 | 4/2007 | Addleman |
| 2008/0033964 A1 | 2/2008 | Richards et al. |
| 2008/0201459 A1 | 8/2008 | Vul et al. |
| 2012/0179644 A1 | 7/2012 | Miranker |
| 2013/0024442 A1 | 1/2013 | Santosuosso et al. |
| 2013/0160014 A1 | 6/2013 | Watanabe et al. |
| 2013/0262638 A1 | 10/2013 | Kumarasamy |
| 2014/0074540 A1 | 3/2014 | Evans et al. |
| 2014/0075499 A1 | 3/2014 | Arun |
| 2014/0156632 A1 | 6/2014 | Yu et al. |
| 2014/0229221 A1* | 8/2014 | Shih ...................... G06F 9/5038 705/7.23 |
| 2014/0280076 A1 | 9/2014 | Sumizawa |
| 2015/0040180 A1 | 2/2015 | Jacobson et al. |
| 2015/0149501 A1 | 5/2015 | Prakash et al. |
| 2015/0234682 A1 | 8/2015 | Dageville et al. |
| 2015/0234896 A1 | 8/2015 | Dageville |
| 2016/0373478 A1 | 12/2016 | Doubleday |
| 2018/0039674 A1 | 2/2018 | Seyvet et al. |

FOREIGN PATENT DOCUMENTS

| | | |
|---|---|---|
| JP | 2015529366 | 10/2015 |
| WO | 2014039919 | 3/2014 |

OTHER PUBLICATIONS

U.S. Appl. No. 15/470,829, filed Mar. 27, 2017, Bhargava Ram Kalathuru et al.

U.S. Appl. No. 15/470,843, filed Mar. 27, 2017, Pratik Bhagwat Gawande et al.

Anonymous, "optimization—Are SQL Execution Plans based on Schema or Data or both?", Stack Overflow.com, Retrieved from the Internet: URL:https://web.archive.org/web/20160708184640/https://stackoverflow.com/questions/4787205/are-sql-execution-plans-based-onschema-or-data-or-both, Jul. 8, 2016.

* cited by examiner

SELECTING INTERRUPTIBLE RESOURCES FOR QUERY EXECUTION

RELATED APPLICATIONS

This application claims benefit of priority to U.S. Provisional Application Ser. No. 62/382,477, entitled "Managed Query Service," filed Sep. 1, 2016, and which is incorporated herein by reference in its entirety.

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, incorrect configuration and/or use of computing clusters such as these can result in the non-optimal utilization of processor, storage, network and, potentially, other types of computing resources.

The disclosure made herein is presented with respect to these and other considerations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1:
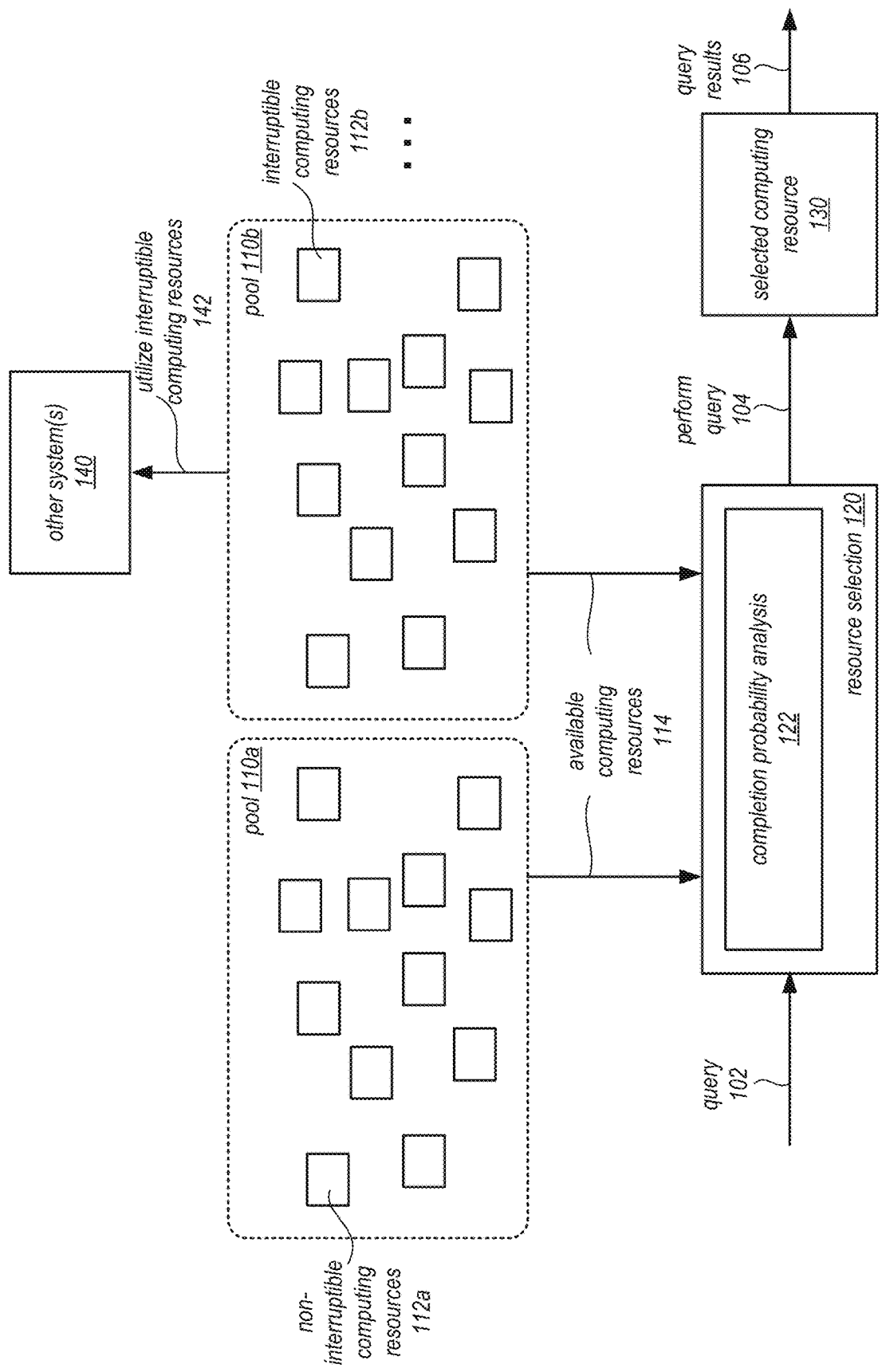
FIG. 1 illustrates a data flow diagram for selecting interruptible resources for query execution, according to some embodiments.

Various embodiments of selecting interruptible resources for query execution are described herein. FIG. 1 illustrates a data flow diagram for selecting interruptible resources for query execution, according to some embodiments. Configured computing resources may be instantiated, configured, and otherwise prepared for executing different types of queries, such as query 102, in some embodiments. For example, configured computing resources may be one or more nodes, instances, hosts, or other collections of computing resources (e.g., a cluster of computing resources) that implement a query engine (e.g., a distributed query processing engine or framework) for executing queries with respect to data sets (e.g., that may be remotely stored), in one embodiment.

Managing pools of computing resources, such as pools 110a and 110b, may involve balancing the efficient utilization of those resources, in some embodiments. In order to satisfy variations in query execution demand, large numbers of computing resources may need to be provisioned, in some embodiments. To prevent the number of provisioned computing resources from being over allocated, interruptible computing resources may be provisioned, which may be interrupted and utilized for performing other tasks, processes, services or other systems 140 that share and/or also utilize 142 the provisioned computing resources with systems that execution queries, in some embodiments. For example, pool 110b may include interruptible computing resources 112b. The terms for interrupting computing resources, such as resources 112 may be specified, agreed to, or otherwise enforced with respect to other systems 140 that share the computing resource, in some embodiments. For example, scheduling algorithms (e.g., round robin), bidding mechanisms (e.g., bids to utilize a resource up to a specified cost which can be interrupted by the submission of other bids with higher specified costs), or other techniques for determining when resources can be interrupted may be implemented, in some embodiments. In at least some embodiments, interruption handling may be implemented so that interruptions of resources may not occur in correlated fashion. In this way, a large number of computing resources may not be interrupted at any one time. For example, if a bidding mechanism is used to establish interruption points for resources, different bid amounts for different resources may be set so that a single higher bid does not interrupt multiple resources at a similar time. To further prevent a system that executes queries from having no available resources, another pool, such as pool 110a may implement non-interruptible computing resources 112a (e.g., which may be reserved or provisioned on-demand without later interruption).

As query execution can be performed utilizing both interruptible and non-interruptible computing resources, various embodiments may implement techniques for selectively routing queries to interruptible computing resources that are likely to complete without being interrupted. For example, resource selection 110 may be implemented to intelligently route queries to resources that are likely to complete performance of a query by implementing completion probability analysis 122. Completion probability analysis 122 may determine an estimated completion time and/or likelihood that a query can complete at an interruptible computing resources, as discussed below with regard to FIGS. 11 and 12. For example, an estimated time for performing a query may be determined within a minimum guaranteed time for executing a query at interruptible computing resources (e.g., due to a warning time period prior to the interruption of the computing resource that may be implemented, such as 10 minutes). If the estimated time is within the minimum guaranteed time, then the probability is high that the query can complete at an interruptible computing resource. Advanced modeling techniques, such as those discussed below with regard to FIGS. 9 and 12 may be implemented in some embodiments to evaluate a query with the performance of prior queries.

For example, as illustrated in FIG. 1, resource selection 110 may receive a query 102. In order to select a resource for query 102, resource selection 110 may obtain available computing resources 114 (e.g., those computing resources not executing another query) and interruptibility types of the resources (e.g., as discussed below with regard to FIGS. 6A-6C). Based on the probability of completing query 102 at an interruptible computing resource 112b, an available computing resource 114 can be selected 130 that is likely to complete the query (e.g., above a probability threshold). The query may be performed 104 at the selected computing resource 130 and query results provided 106 in response to query 102, in various embodiments.

Please note that the previous description of selecting interruptible resources for query execution is a logical illustration and thus is not to be construed as limiting as to the implementation of resource selection, computing resources, or completion probability analysis.

This specification begins with a general description of a provider network that implements a managed query service that manages the execution of received queries by selecting resources to execute the queries, including selecting interruptible resources. Then various examples of the managed query service (along with other services that may be utilized or implemented) including different components/modules, or arrangements of components/module that may be employed as part of implementing the services are discussed. A number of different methods and techniques to implement selecting interruptible resources for query execution are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
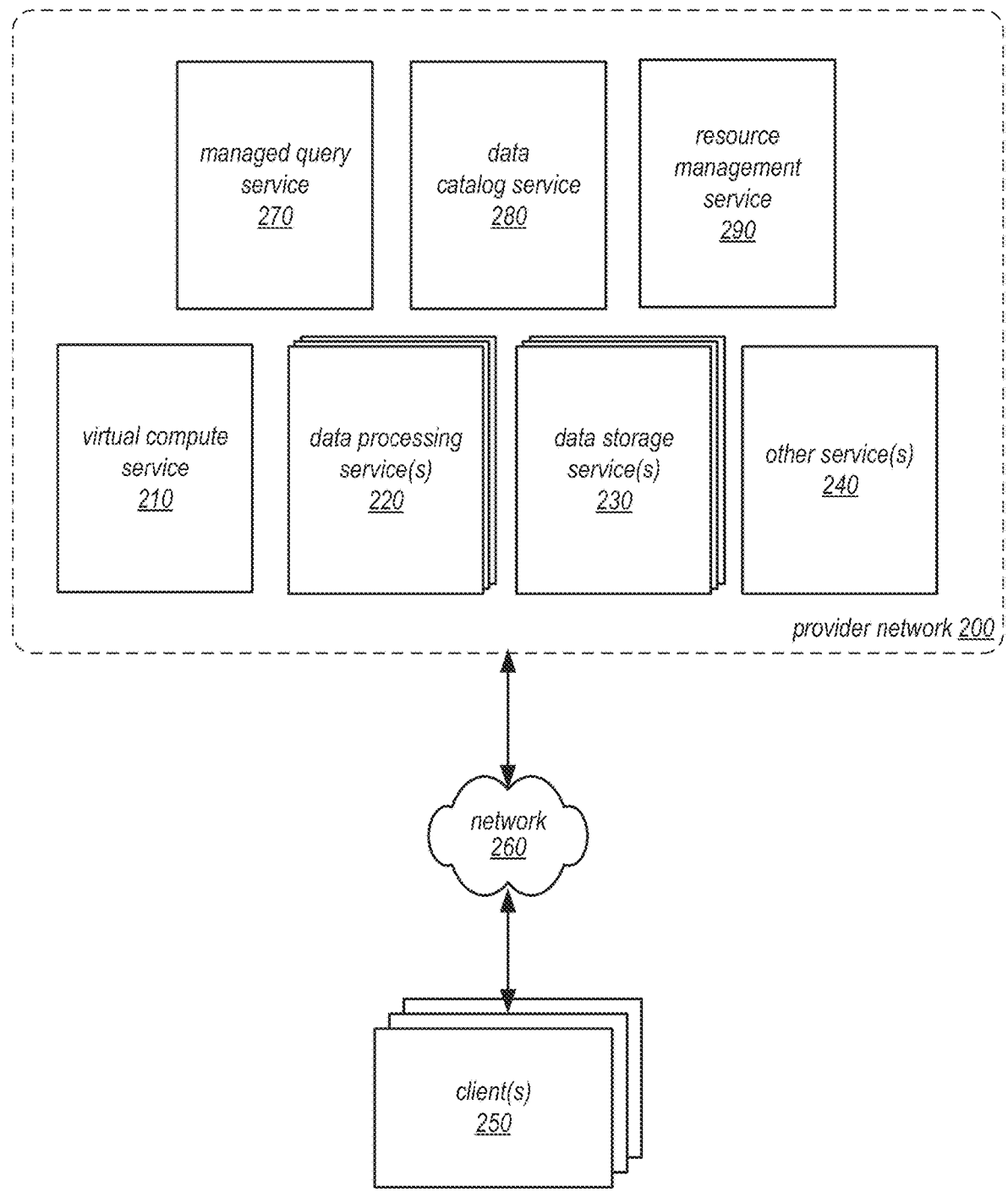
FIG. 2 is a logical block diagram illustrating a provider network offering a managed query service that selects interruptible resources for executing queries, according to some embodiments.

FIG. 2 is a logical block diagram illustrating a provider network offering a managed query service that selects interruptible resources for executing queries, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 15, 16 and computing system 2000 described below with regard to FIG. 17), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-6C.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-9, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf the different services, as discussed above with regard to FIG. 1.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document-based or message-based, network-based services architecture, or other network-based services architecture.

In some embodiments, a client 250 may provide access to provider network 200 to other applications in a manner that is transparent to those applications. For example, client 250 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
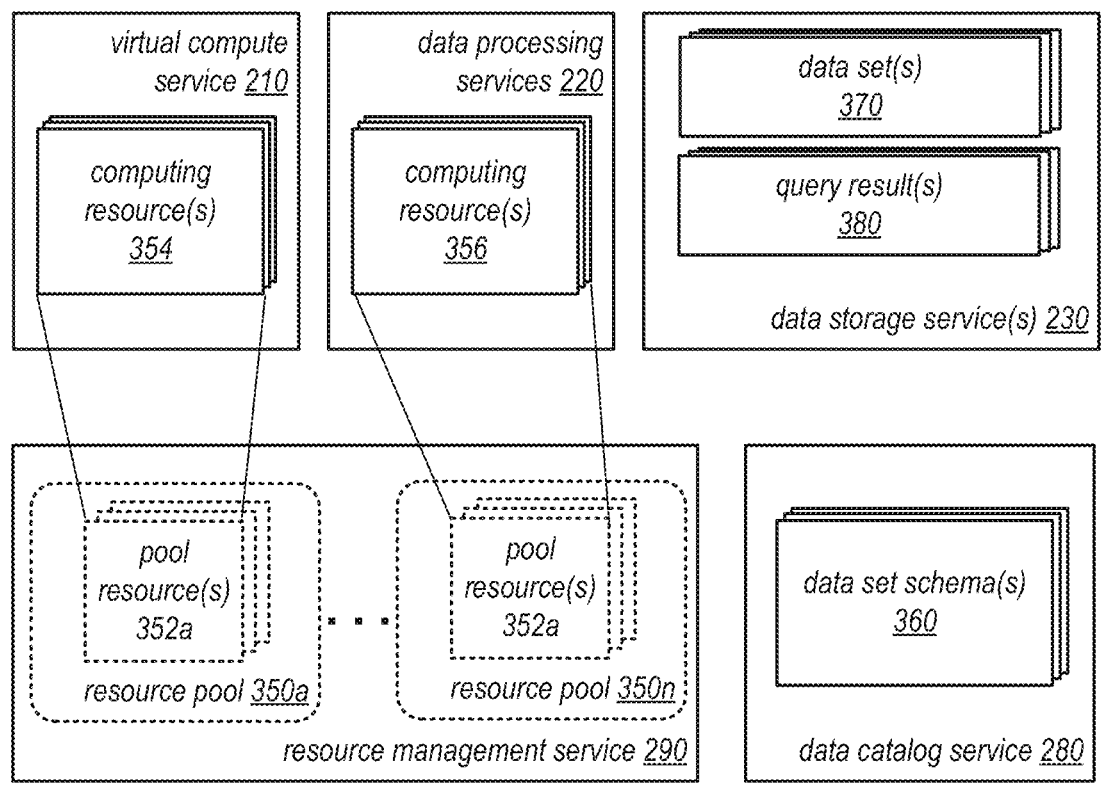
FIG. 3 is a logical block diagram illustrating a managed query service, according to some embodiments.
Figure 3:
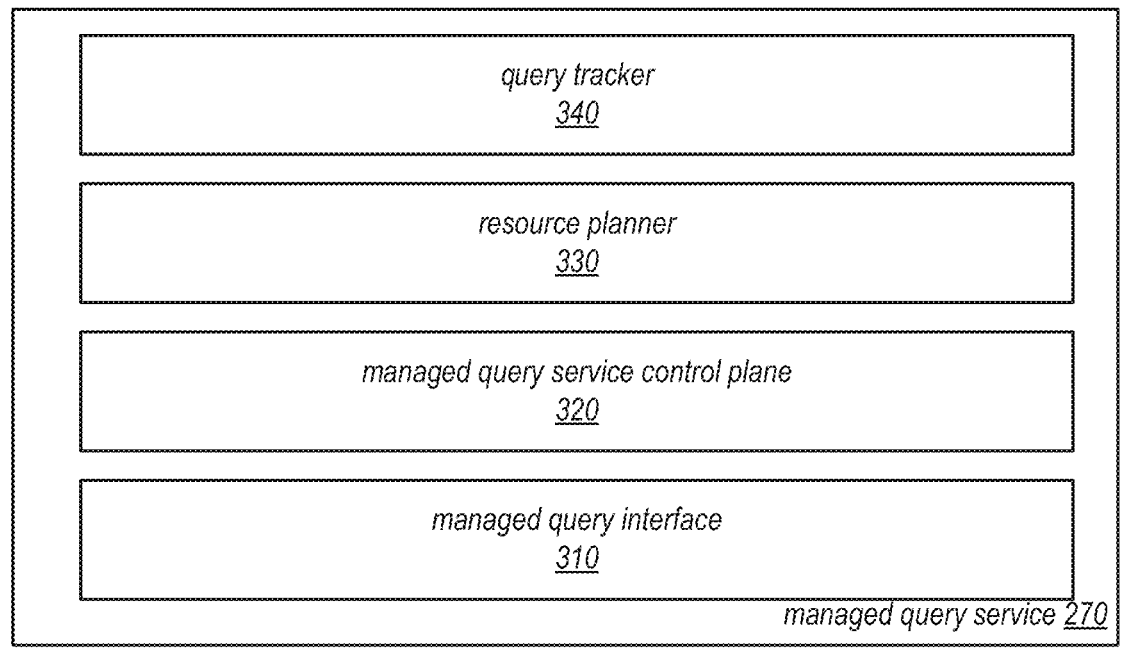

FIG. 3 is a logical block diagram illustrating a managed query service, according to some embodiments. As discussed below with regard to FIGS. 4-9, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350*a* and 350*n* that include pool resource(s) 352*a* and 352*n* from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services. Resource management service 290 may determine and provision a number of interruptible computing resources, in some embodiments, for processing queries received at managed query service 270.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIGS. 4, for subsequent use when processing queries, as discussed below with regard to FIGS. 5-7, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIGS. 5 and 6. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments, as discussed in more detail below with regard to FIG. 9. For example, resource planner 330 may evaluated collected data statistics associated with query execution (e.g., reported by computing resources) and determine a probability of completing a query at an interruptible resource without being interrupted. For example, machine learning techniques may be applied by resource planner 330 to generate a query estimation model that can be applied to the features of a received query to determine the estimated completion time, in one embodiment. Similarly, techniques to determine a an estimated remaining resource time before interruption (e.g., a resource time to live value) may be performed. Resource planner 330 may then provide or identify which ones of the resources available to execute the query from a pool that may likely complete the query in the estimated completion time and/or the estimated remaining resource time, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIG. 5).

Figure 4:
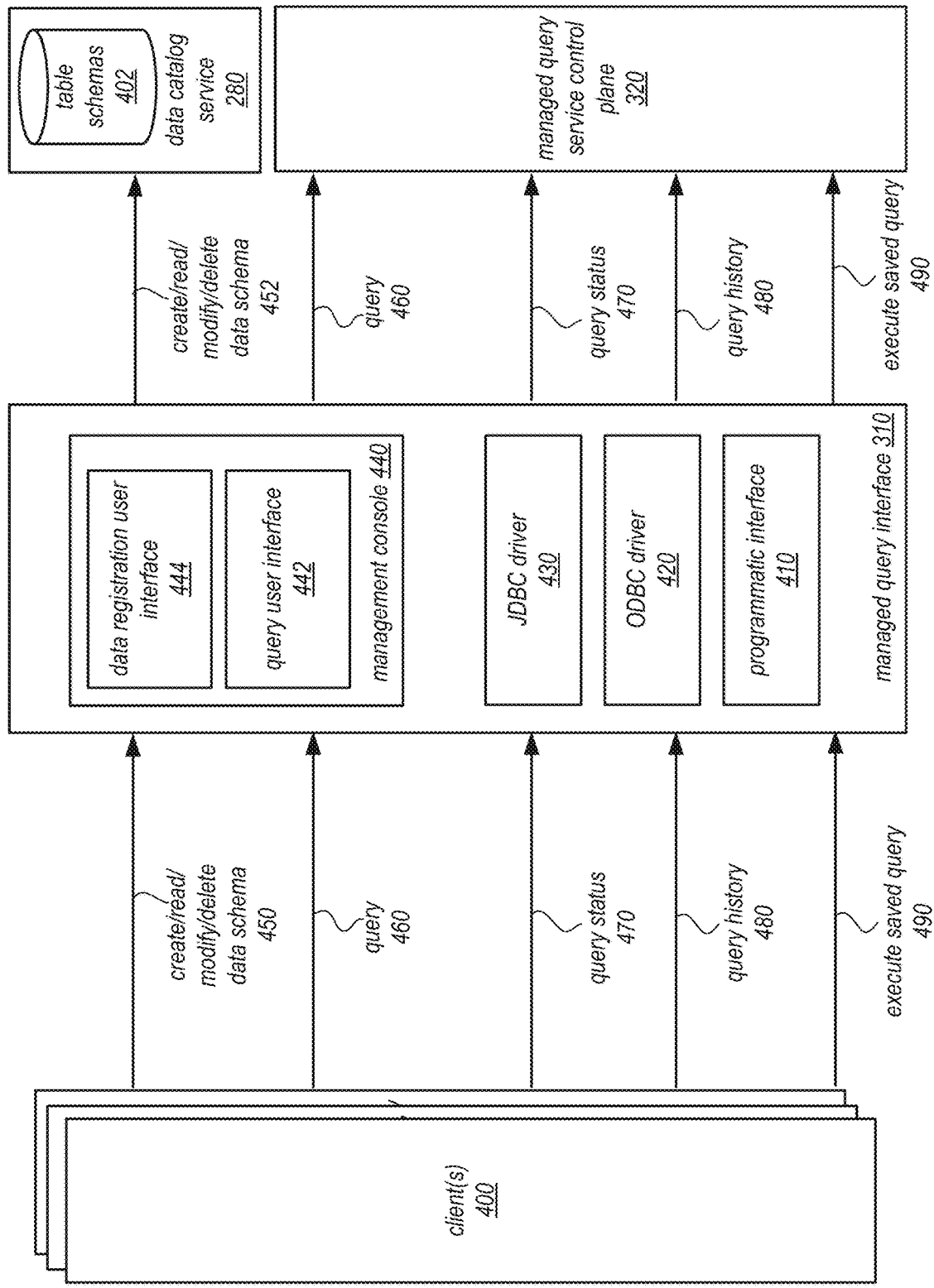
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 5. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIG. 5).

Figure 5:
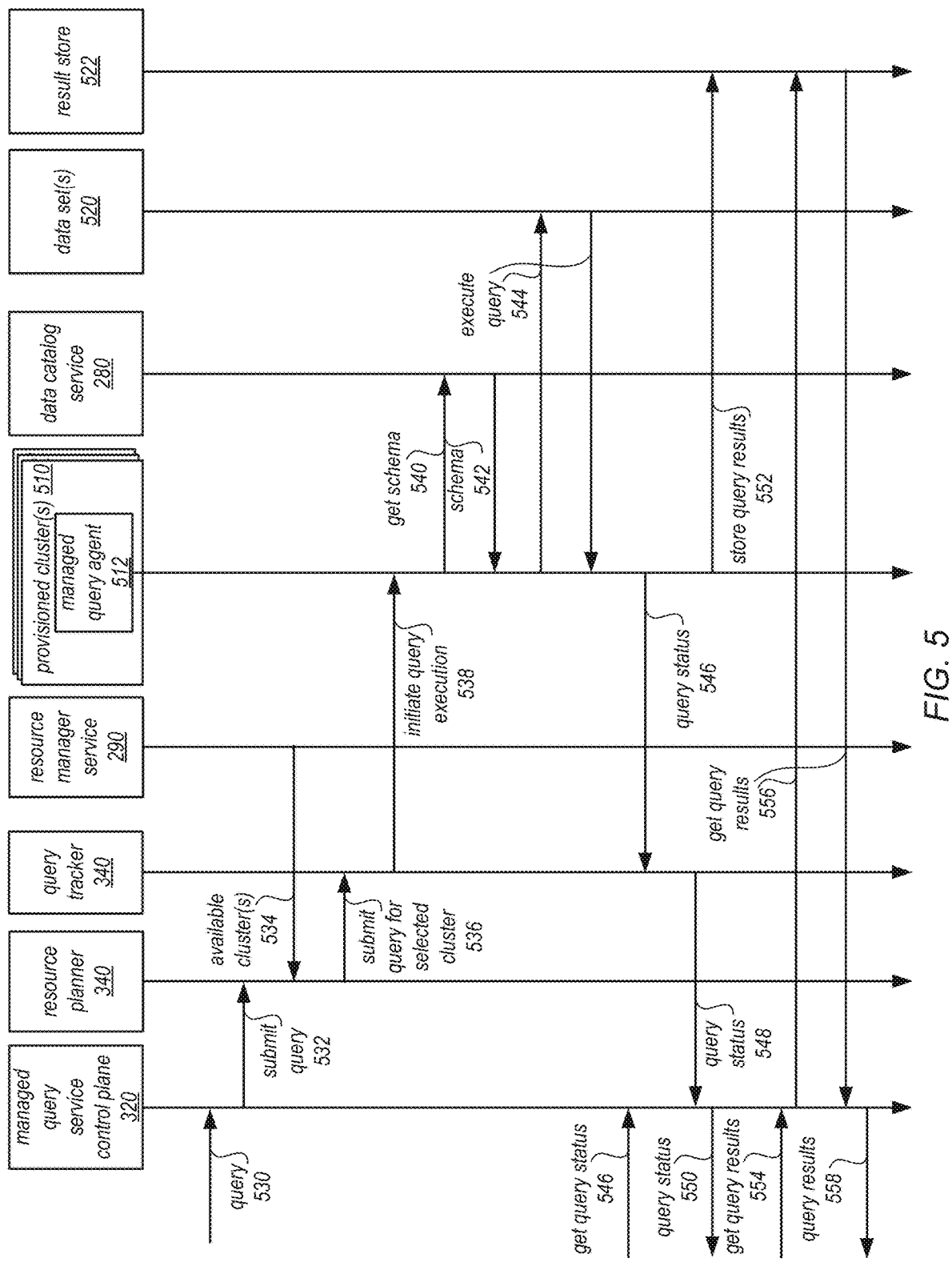
FIG. 5 is a sequence diagram for managed execution of queries utilizing a resource planner, according to some embodiments.

FIG. 5 is a sequence diagram for managed execution of queries utilizing a resource planner, according to some embodiments. Query 530 may be received at managed query service control plane 320 which may submit the query 532 to resource planner 340. Resource planner 340 may analyze the query to determine whether the query can be executed on interruptible cluster(s) based on a probability that the query can complete and select from available cluster(s) 534 received from resource management service 290. Resource planner 340 may then submit the query to query tracker 340 indicating the selected cluster 536 for execution. Query tracker 340 may then initiate execution of the query 538 at the provisioned cluster 510, sending a query execution instruction to a managed query agent 512. In some embodiments, multiple provisioned clusters 510 may be selected so that the same query is performed at multiple locations. At least one of the clusters may not include interruptible resources. In other embodiments, all clusters may include one or more interruptible resources which may be unlikely to interrupt at similar times during the execution of the query (e.g., as interruptions may not correlated) so that the probability of all provisioned clusters failing due to interruption is small.

Managed query agent 512 may get schema 540 for the data sets(s) 520 from data catalog service 280, which may return the appropriate schema 542. Provisioned cluster 510 can then generate a query execution plan and execute the query 544 with respect to data set(s) 520 according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive a request to get a query results 554 and get query results 556 from results store 522 and provide the query results 558 in response, in some embodiments.

Figure 6A:
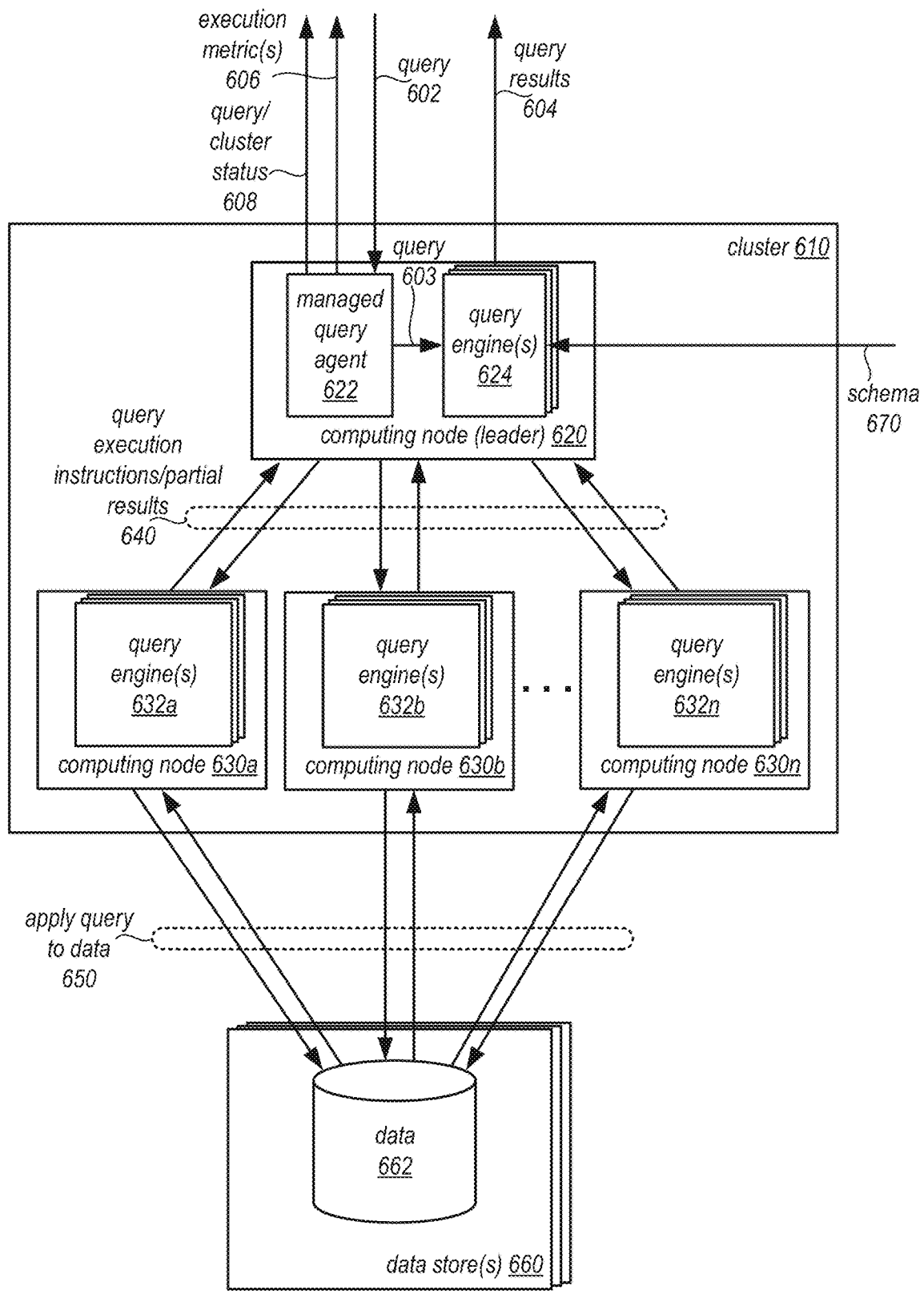
FIGS. 6A-6C are logical block diagrams illustrating clusters of different interruptibility types processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 6A is a logical block diagram illustrating a cluster processing a query as part of managed query execution, according to some embodiments, according to an interruptibility type that does not include interruptible computing resources. Cluster 610 may implement a computing node 620 that is a leader node (according to the query engine 624 implemented by cluster 610). In some embodiments, no single node may be a leader node, or the leader node may rotate from processing one query to the next. Managed query agent 622 may be implemented as part of leader node 620 in order to provide an interface between the provisioned resource, cluster 610, and other components of managed query service 270 and resource management service 290. For example, managed query agent 622 may provide further data to managed query service 270, such as the status 608 of the query (e.g. executing, performing I/O, performing aggregation, etc.,) and execution metrics 606 (e.g., health metrics, resource utilization metrics, cost metrics, length of time, etc.). In some embodiments, managed query agent 622 may provide cluster/query status 608 and execution metric(s) 606 to resource management service 290 (in order to make pool management decisions, such as modification events, lease requests, etc.). For example, managed query agent 622 may indicate cluster status 608 to resource management service 290 indicating that a query has completed and that the cluster 610 is ready for reassignment (or other resource lifecycle operations).

Leader node 620 may implement query engine 624 to execute queries, such as query 602 which may be received via managed query agent 622 as query 603. For instance, managed query agent may implement a programmatic interface for query tracker to submit queries (as discussed above in FIG. 5), and then generate and send the appropriate query execution instruction to query engine 624. Query engine 624 may generate a query execution plan for received queries 603. In at least some embodiments, leader node 620, may obtain schema information for the data set(s) 670 from the data catalog service 280 or metadata stores for data 662 (e.g., data dictionaries, other metadata stores, other data processing services, such as database systems, that maintain schema information) for data 662, in order to incorporate the schema data into the generation of the query plan and the execution of the query. Leader node 620 may generate and send query execution instructions 640 to computing nodes that access and apply the query to data 662 in data store(s) 660. Compute nodes, such as nodes 630a, 630b, and 630n, may respectively implement query engines 632a, 632b, and 632n to execute the query instructions, apply the query to the data 650, and return partial results 640 to leader node 620, which in turn may generate and send query results 604. Query engine 624 and query engines 632 may implement various kinds of distributed query or data processing frameworks, such as the open source Presto distributed query framework or the Apache Spark framework.

Figure 6B:
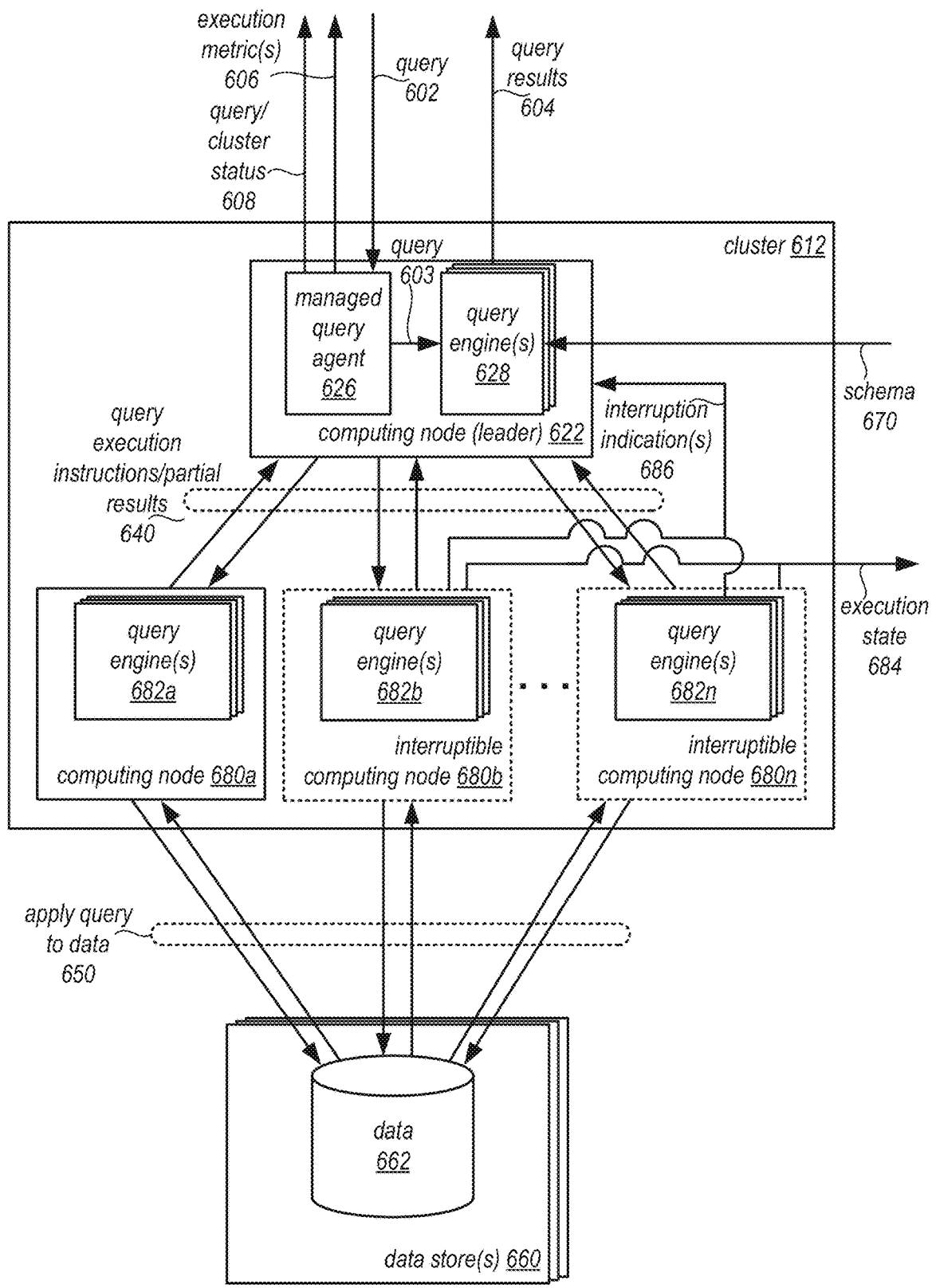
Figure 6C:
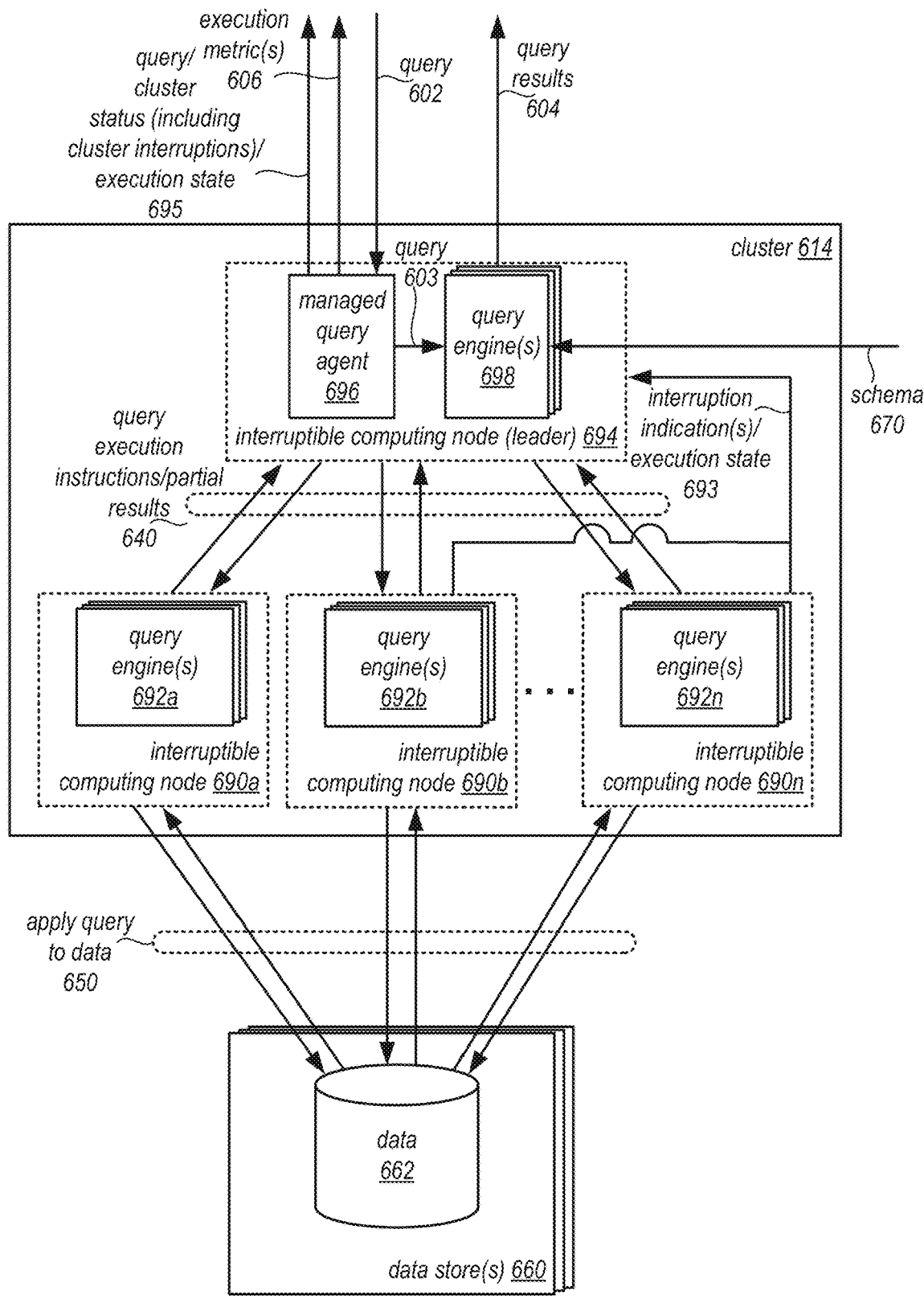

FIGS. 6B and 6C illustrate example compute clusters with interruptibility types that include interruptible computing resources. For example, cluster 612 in FIG. 6B may implement similar components and interactions to perform a received query 602, such as leader node 622 (implementing managed query agent 626 and query engines 628) and computing nodes, 680a, 680b, and 680n (implementing query engines 682a, 682b, and 682n respectively). However, some of the computing nodes, such as computing node 680b and 680n may be interruptible. Interruptible computing nodes may provide indications of interruptions 686 that occur to leader node 622, in some embodiments. In at least some embodiments, interruptible computing nodes 680b and 680n may provide execution state 684 to query tracker 340 or other data store separate from cluster 612 for later failover operations, as discussed below with regard to FIGS. 7 and 13.

FIG. 6C may implement similar components and interactions to perform a received query 602, such as leader node 694 (implementing managed query agent 696 and query engines 698) and computing nodes, 690, 690b, and 690n (implementing query engines 692a, 692b, and 692n respectively). However, all of the computing nodes may be interruptible in cluster 614. Interruptible computing nodes may provide indications of interruptions and/or execution state 693 to leader node 694, in some embodiments. In at least some embodiments, leader node 694 may provide execution state and/or cluster interruptions as part of query and cluster state information provided to query tracker 340 and/or to another data store separate from cluster 614 for later failover operations, as discussed below with regard to FIGS. 7 and 13.

Figure 7:
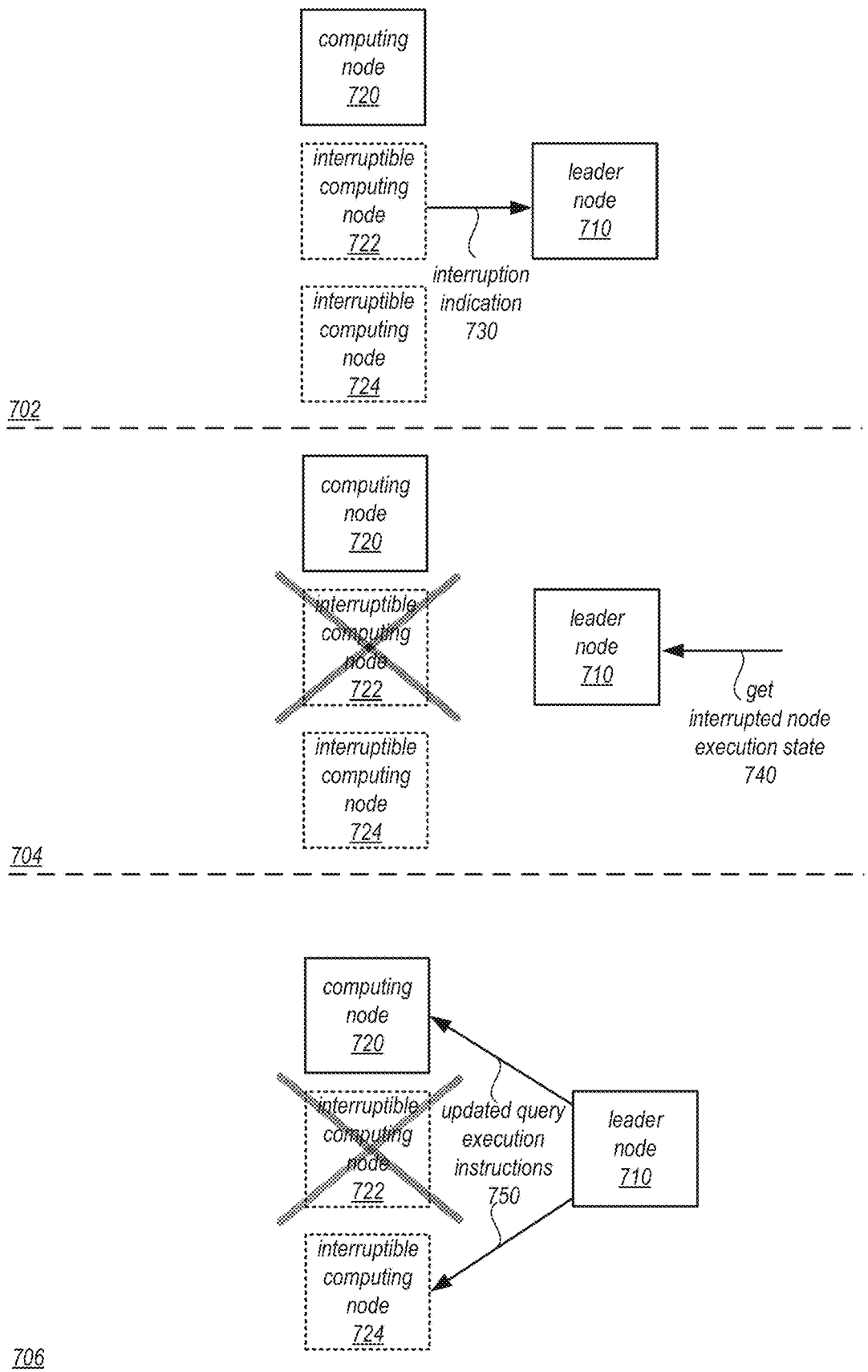
FIG. 7 is a series of diagrams illustrating the completion of a query at a cluster that includes an interrupted compute node, according to some embodiments.

FIG. 7 is a series of diagrams illustrating the completion of a query at a cluster that includes an interrupted compute node, according to some embodiments. Scene 702 illustrates a cluster, including leader node 710 and computing nodes 720, 722, and 724. Both computing nodes 722 and 724 are interruptible. If an interruption of a computing node occurs, an indication may be provided to leader node 710, such as interruption indication 730. As illustrated in scene 704, computing node 722 is no longer available to perform the query. Leader node 710 may obtain 740 the execution state for the interrupted node (e.g., performed operations, unperformed operations, partial results, etc.). For example, leader node 710 may request the execution state from query tracker 340 or another data store maintaining the execution state of interruptible nodes. As illustrated in scene 706, leader node 710 may generate updated query execution instructions and provide them to remaining nodes 724, in some embodiments. For example, updated instructions 750 may redistribute scan operations or other operations in a generated query plan for the query.

Figure 8:
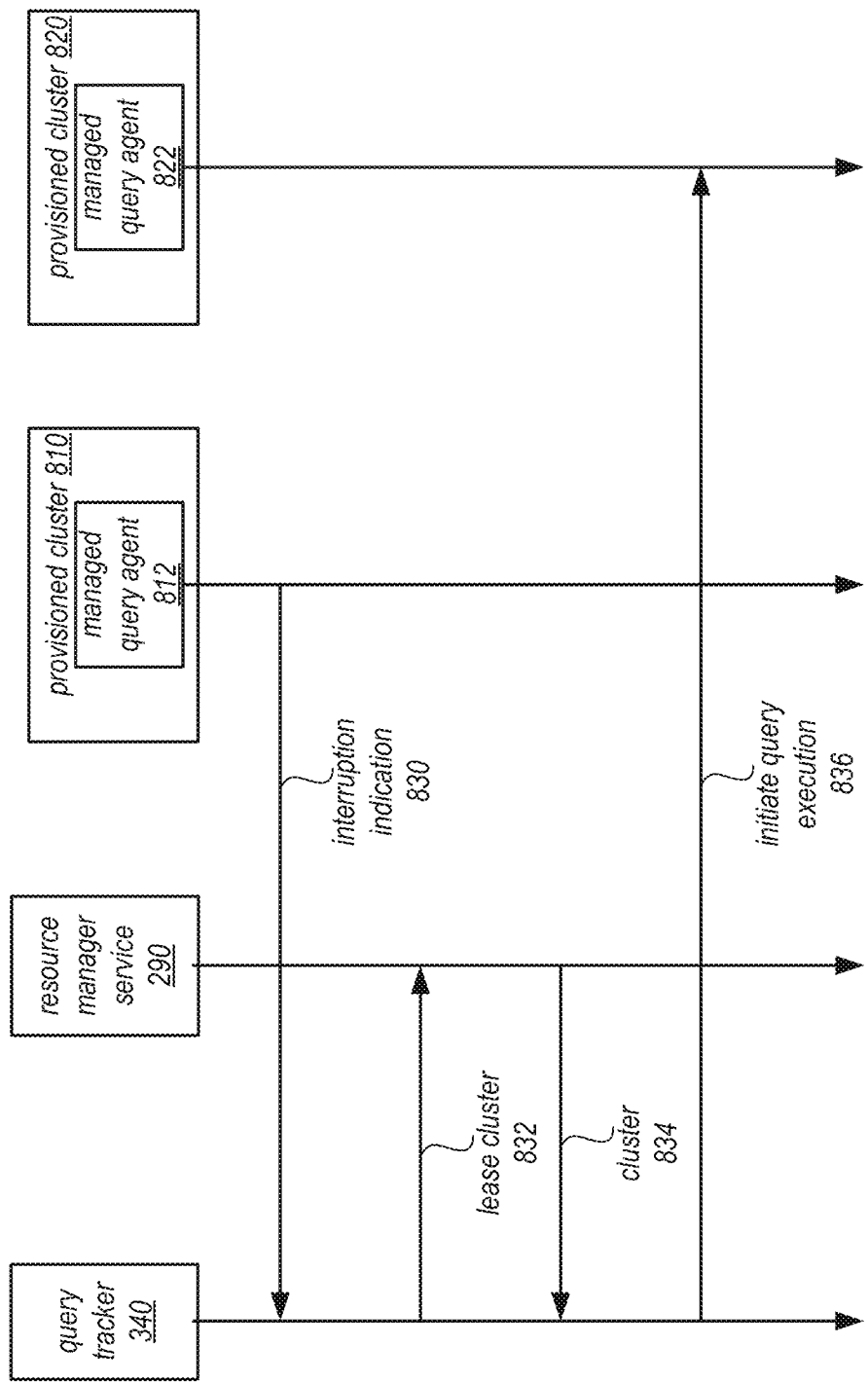
FIG. 8 is a sequence diagram for retrying a query at a different cluster, according to some embodiments.

In some scenarios, as discussed below with regard to FIG. 13, a query performing upon a cluster with an interruptible resource may be interrupted. FIG. 8 is a sequence diagram for retrying a query at a different cluster, according to some embodiments. Provisioned cluster 810 may be executing a query submitted query (e.g., as discussed in FIG. 5 above). One, multiple, or all of the nodes in cluster 810 may be interrupted (e.g., by virtual compute service 210 or data processing service 220). Managed query agent 812 may send an interruption indication 830 to query tracker 340 indicating the identity of the interrupted resources, in some embodiments. Query tracker 340 may determine whether provisioned cluster 810 can complete the query. If not, query tracker 340 may lease a new cluster 832 from resource manager service 290. In some embodiments, by default the new cluster, provisioned cluster 820 may include less or no interruptible computing resources. Once query tracker 340 obtains the new cluster 834, query tracker 340 may then initiate execution of the query 836 at provisioned cluster 822, in some embodiments.

Figure 9:
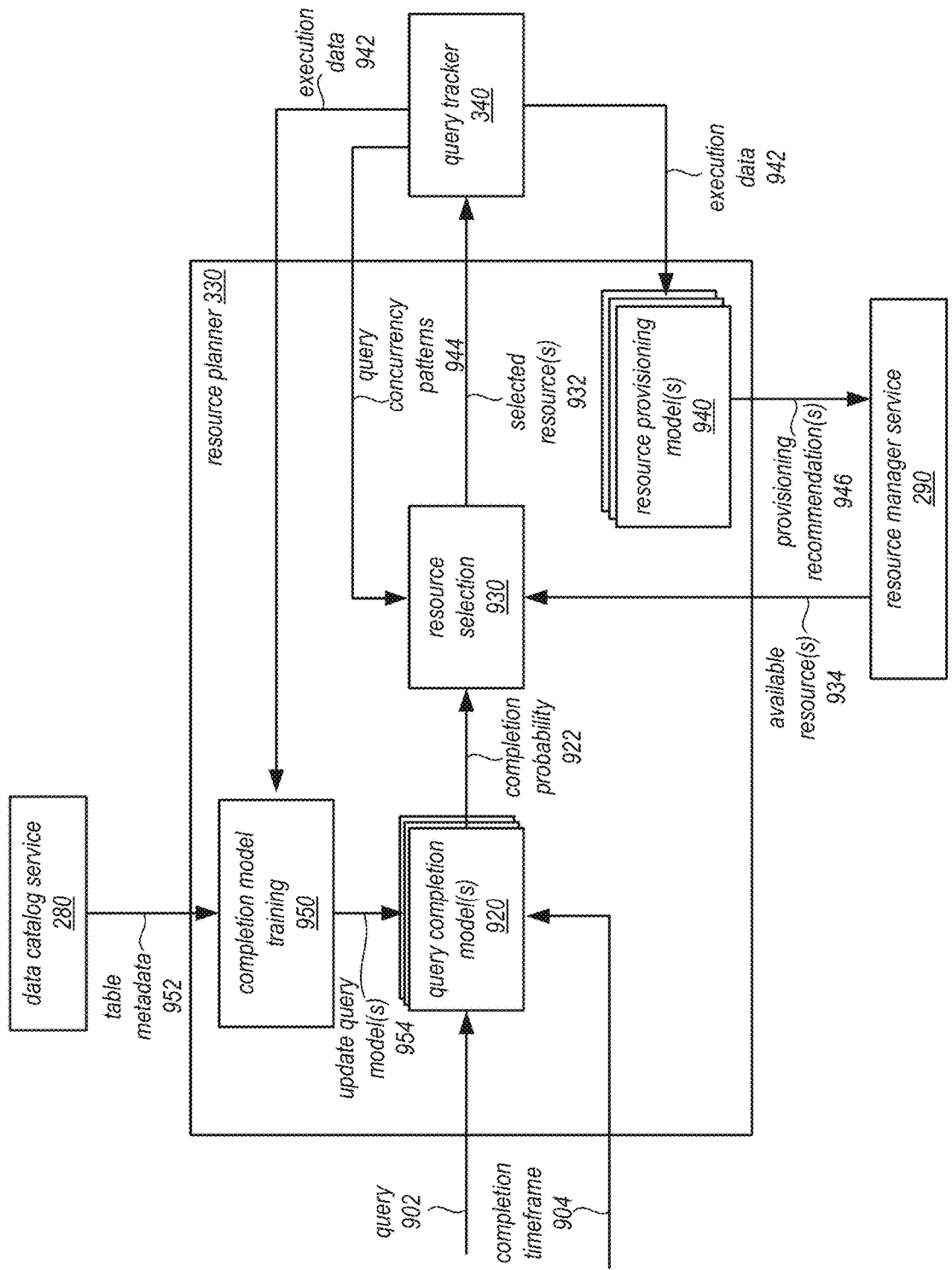
FIG. 9 is a logical block diagram illustrating a resource planner that selects interruptible resources for executing queries, according to some embodiments.

FIG. 9 is a logical block diagram illustrating a resource planner that selects interruptible resources for executing queries, according to some embodiments. Resource planner 330, as discussed above, may determine or select whether a query can be performed on interruptible resources. As illustrated in FIG. 9, a query 902 may be received at resource planner 330. Resource planner may implement one or more query completion model(s) 920 to evaluate the query 902. Query completion model(s) 920 may be generated using various types of machine learning and other statistical analyses. For example, resource planner 330 may implement completion model training 950 to receive information for inclusion in the query completion model(s) 920 and update the query model(s) 954, providing supervised learning to adjust the model to map different types of queries with different outcomes (e.g., completion time, interrupted queries, etc.). In this way, query model(s) 920 can classify or otherwise identify features to be compared with received queries 902 in order to determine a probability that a query can complete at an interruptible computing resource. In some embodiments, the probability determination may be modified according to a completion timeframe 904 (or lack thereof) provided for query 902 (e.g., as part of a query hint or specified according to a service level agreement (SLA) for query managed query service 270). For example, an estimated or likely completion time may be determined for query 902 which may then be compared with a completion timeframe 904. If the different between the times is small, then the probability of an interruption that can be tolerated may be very low (or not tolerated) such that the resource selection 922 does not include any interruptible resources or is a selection of multiple resources to execute the query in parallel.

Query model(s) 920 can be generated using many different sources of information. For example, as illustrated in FIG. 9, completion model training 950 may include table metadata 952 as part of training and updating query model(s) 920, in some embodiments. Table metadata may include information describing tables or other data evaluated or searched by queries, such as the number of rows in a table, the number of distinct values in a column, the number of null values in a column, the distribution of data values in a column (e.g., according to a histogram), the cardinality of data values in a column, size or number of data blocks in a table, index statistics, and the like. In at least some embodiments, table metadata 952 may be obtained from data catalog service 280 and obtained via API or other requests to data catalog service to receive the table metadata 952.

Query model(s) 920 may also be generated using execution data 942 received from the execution of queries at computing resources of different configurations, in some embodiments. For example, the memory consumed, processing capacity consumed, number of slots, nodes, or other execution units consumed/utilized, execution plans for prior queries (e.g., including the various types of operations selected by the plan to perform the prior queries), the total execution time to perform the query, a resource or determined cost (e.g., in terms of work or cost units, such as IOPS or monetary units), the occurrence of resource interruptions, failure or success indications, or failure types (e.g., including error codes or exceptions generated).

Updates to query completion model(s) 954 may be periodically performed (e.g., daily or weekly) or in response to trigger events (e.g., number of queries processed since last update, number of new queries processed since last update, new set of execution data 942 or table metadata 954 received etc.), in some embodiments. Completion model training 950 may apply different types of machine learning techniques to generate and update query completion model(s) 920. For instance, the information related to a prior query (e.g., execution metadata, including the query execution plan, execution costs, etc., and table metadata, including number of rows in access tables) may be used to generate feature vectors that create a feature space for performing comparisons with newly received queries, in one embodiment. Feature extraction or selection techniques may be implemented to determine which data (e.g., what kinds of table metadata or execution data) are more determinative for different performance outcomes for a query in order to adjust the query model(s), in some embodiments. Note that although supervised learning techniques are described above, in some embodiments, query completion model(s) 920 may be generated using unsupervised learning techniques.

Query completion model(s) 920 may be applied to received queries in order to determine a probability of completion at different types of interruptible computing resources, such as a hybrid or completely interruptible cluster. For example, query 902 may be received at resource planner 330. In some embodiments, resource planner 330 may implement different query plan generator(s) for query engine(s). Different types of query engines may be implemented to execute queries, and thus, plan generators for the different possible query engines may be implemented in order to generate an execution plan for each query engine. For example, a query engine utilizing the Presto framework may generate a different query execution plan than a query engine utilizing the Apache Spark framework. Similarly, different query completion model(s) 920 may be maintained for the different query engines, in some embodiments. Query plans may include various kinds operations that may be performed to execute a query, such as different types of join operations (e.g., hash joins, distributed joins, etc.), different types of scan operations, aggregation operations, predicate filters, and the like.

The query and query execution plans may be provided and evaluated using query completion model(s) 920. For example, a feature vector for the query based on the query execution plan and completion timeframe 904 may be generated so that the feature vector can then be compared or classified (e.g., using a linear function that assigns a score for each possible configuration), in one embodiment. Scores, or other configuration information, may be determined for each query model in embodiments implementing multiple query model(s). The resulting classifications may include a number of interruptible or non-interruptible nodes, slots, containers, or other components for a computing resource (e.g., in a cluster) as well as the configuration of (e.g., settings enabled) for a query engine. For example, different query engines may provide many different kinds of configuration or optimization settings that can be enabled or disabled, in some embodiments, which may impact the completion time of a query. As part of applying the query completion model(s) 920, for instance, different configurations of a Presto framework may be determined (e.g., configurations that enable or disable features such as memory configuration properties, log file location properties, worker configuration properties, coordinator configuration properties, catalog properties, Java Virtual Machine (JVM) properties, optimizer properties, node scheduler properties, exchange properties, distributed joins, distributed index joins, redistributed writes, session properties, etc.).

Application of query completion model(s) 920 may classify or otherwise indicate a completion probability (e.g., that satisfies the execution timeframe 904). Execution time frames 902 may be specified as time limitations (e.g., query execution time limits), or other limitations from which an execution timeframe can be derived (e.g., number of resource units or cost units consumed to execute the query, service level agreements (SLAs), performance models, cost models, or any other limitation that may be placed on the execution of the query).

Resource selection 930 may obtain a set (e.g., a snapshot of) available resource(s) 934 for executing the query from resource manager service. Note that the available resource(s) 934 may be provided to query selection engine 930 prior to the receipt of query 902, in some embodiments. Query selection engine 930 may then compare the available resource(s) 934 (e.g., including the different types of interruptibility of computing resources in the available computing resource) to select the resource(s) to execute the query. For example, resource selection 930 may compare the number of interruptible nodes in a cluster to see if the number of interruptible nodes meets or exceeds the number of interruptible nodes mapped to completion probability 922, in one embodiment. Similarly, resource selection 930 may also compare the configuration(s) of the different resources, such as the engine type (e.g., Presto, Apache Spark, etc.) and a configuration of the engine (e.g., which properties are enabled or disabled on the engine) which may also be specified for the completion probability 922 (e.g., engine A has a 90% completion probability, engine B has an 83% completion probability, etc.). In some embodiments, resource selection may also utilize a probability determination may be performed with respect to the expected lifetime of an interruptible computing resource (e.g., as indicated by available resource(s) 934), which may be included as part of query completion model(s) 920 or through separate modeling and analysis (not illustrated). For example, the likelihood of interruption for an available resource 934 may disqualify the resource from consideration of selection (even if the query itself has a high tolerance for interruptible computing resources as determined by completion probability 922).

In some embodiments, resource selection 930 may select a candidate list of resources that map to completion probability 922. Resource selection 930 may then provide selected resource(s) 932 to query tracker 340 in order to execute the query. If the selected resource(s) are no longer available (e.g., due to failure or having already been assigned a query in the time between indicated as available 934 and selected 932), then another resource from the candidate set may be selected 932 (or the candidate set may be provided to query tracker 340, in some embodiments, for retry until assignment).

In some embodiments, query concurrency patterns 944 may alter or modify the selection of resources. For instance, as noted above a same client, user, customer, or submitter may submit multiple queries which may be routed to the same resource so that the queries can be executed without recycling or scrubbing the resource (as the queries would not be executed on resources for which the submitter of the query had not right to access the data or results of the other queries executing at that resource). Query concurrency patterns 944 may indicate the likelihood that a same submitter will submit another query in addition to query 902, as well as the type of query the subsequent query may be, in some embodiments. In some embodiments, resource selection 930 may select a query engine that is likely to complete both the received query 902 as well as the likely subsequent query. In this way, resource selection 930 may still allow for queries to be co-located on resources executing queries from the same submitter.

In at least some embodiments, resource planner 330 may implement resource provisioning model 940. Resource provisioning model 940 may be a model that is generated from execution data 942 for previously executed queries to determine or recommend resources (including the interruptibility types of the resources) for provisioning, in some embodiments. For example, resource provisioning model 940 may be generated from various unsupervised learning techniques, such as clustering analysis, dimensionality reduction, and other such techniques to determine which resource configurations (e.g., query engine types, query engine configurations, number of nodes, slots, or units) and interruptibility types are likely to complete execution of queries (e.g., according to the techniques for selection resources at resource selection 930). For example, clustering analysis may be performed to identify that ninety percent of clusters have query engine type A, configuration settings B set, and have C number of interruptible or non-interruptible nodes. Thus, resource provisioning model 940 may provide a recommendation 946 to provision more resources with query engine type A, configuration settings B set, and have C number of interruptible nodes. In some embodiments, resource provisioning model 940 may provide general provisioning recommendations according to a set of classifications (e.g., small clusters, medium clusters, larger clusters with engine type A, configuration settings B set, C numbers of interruptible nodes). In at least some embodiments, multiple resource provisioning models 940 may be implemented to forecast resource demand, in some embodiments.

Figure 10:
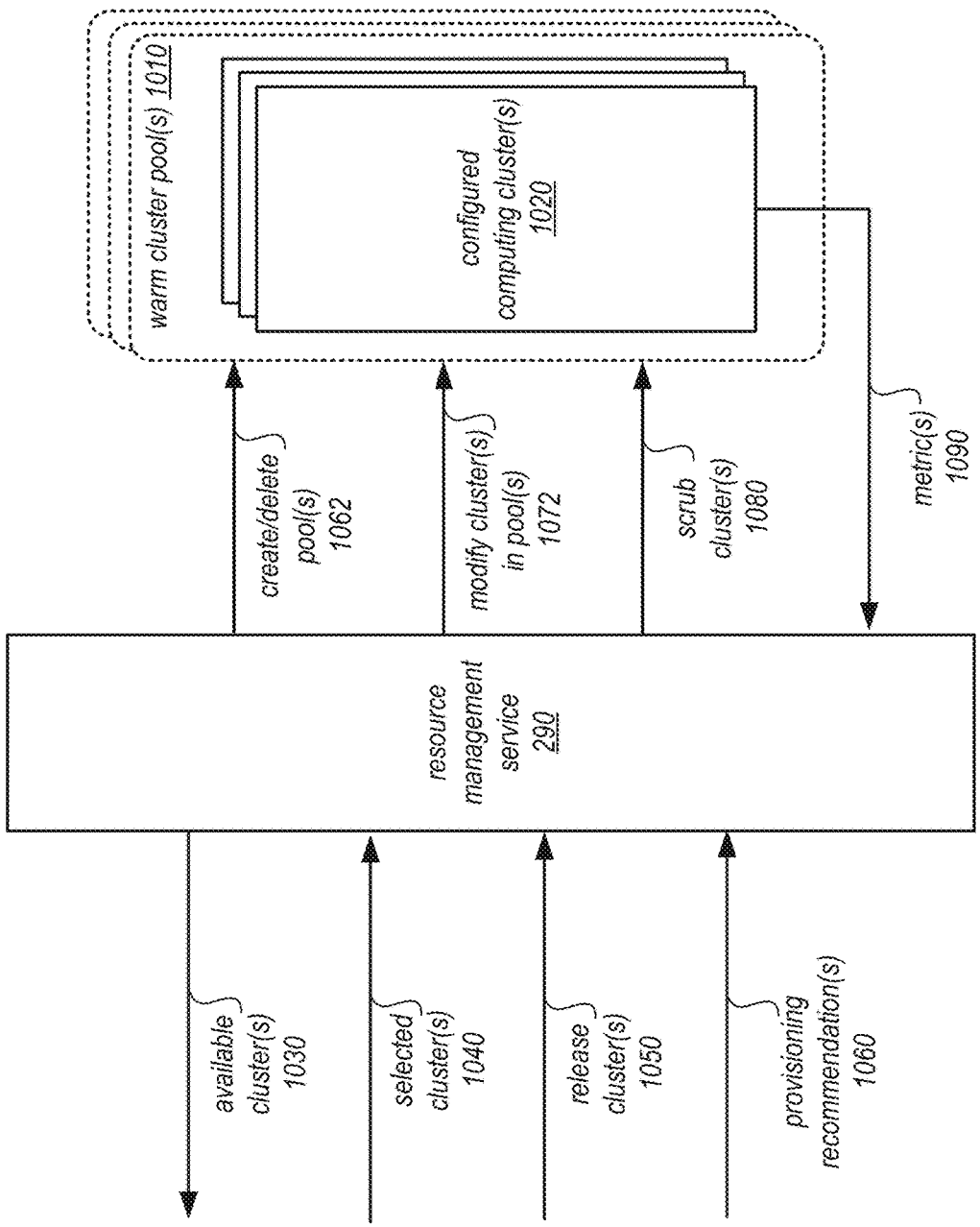
FIG. 10 is logical block diagram illustrating interactions between a resource management service and pools of resources, according to some embodiments.

FIG. 10 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for available clusters 1030 may be received (e.g., from resource planner 330) in order to provide a snapshot or other state of configured computing clusters 1020 in warm cluster pools 1010. As discussed above with regard to FIGS. 5 and 9, resource planner 330 may then provide a selected cluster for the query tracker to use for a received query. Query tracker may send an indication that identifies the selected cluster 1040 (e.g., by specifying a location, identifier, or other information for the identified computing resource) so that resource manager service 290 may remove the resource from the pool of available resource. For example, resource management service 290 may update state information for the cluster to indicate that the cluster is leased or otherwise unavailable. Resource management service 290 may also receive requests to release a cluster 1050 from a current assignment (e.g., as the query execution at the cluster is complete). Resource management service 290 may then update state information (e.g., the lease) for the cluster and pool to return the cluster to the pool, in some embodiments.

As indicated at 1062, resource management service 290 may automatically (or in response to requests (not illustrated)), commission or decommission pool(s) of clusters 1010. For example in some embodiments, resource management service 290 may perform techniques that select the number and size of computing clusters 1020 for the warm cluster pool 1010. The number and size of the computing clusters 1020 in the warm cluster pool 1010 can be determined based upon a variety of factors including, but not limited to, historical and/or expected volumes of query requests, the price of the computing resources utilized to implement the computing clusters 1020, and/or other factors or considerations, in some embodiments. For example, FIG. 14, discussed below, describes a determination on whether replacement computing resources should be provisioned for a computing resource that is interrupted, in some embodiments, that may be performed by resource management 290 to modify cluster(s) 1072.

Once the number and size of computing clusters 1020 has been determined, the computing clusters 1020 may be instantiated, such as through the use of an on-demand computing service, or virtual compute service or data processing service as discussed above in FIG. 2. The instantiated computing clusters 1020 can then be configured to process queries prior to receiving the queries at the managed query service. For example, and without limitation, one or more distributed query frameworks or other query processing engines can be installed on the computing nodes in each of the computing clusters 1020. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 1020. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 1020.

Instantiated and configured computing clusters 1020 that are available for use by the managed query service 270 are added to the warm cluster pool 1010, in some embodiments. A determination can be made as to whether the number or size of the computing clusters 1020 in the warm cluster pool needs is to be adjusted, in various embodiments. The performance of the computing clusters 1020 in the warm cluster pool 1010 can be monitored based on metric(s) 1090 received from the cluster pool. The number of computing clusters 1020 assigned to the warm cluster pool 1010 and the size of each computing cluster 1020 (i.e. the number of host computers in each computing cluster 1020) in the warm cluster pool 1010 can then be adjusted. Such techniques can be repeatedly performed in order to continually optimize the number and size of the computing clusters 1020 in the warm cluster pool 1010. Configurations of clusters for a resource pool or a new pool may be provided as provisioning recommendations (as discussed above with regard to FIG. 9), which may indicate the configuration of a cluster (e.g. query engine type, query engine configuration settings, numbers of interruptible or non-interruptible computing resources, etc.).

As indicated at 1080, in some embodiments, resource management service 270 may scrub clusters(s) 1080, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 1020 is inactive (e.g. the computing cluster 1020 has not received a query in a predetermined amount of time). If resource management service 290 determines that the computing cluster 1020 is inactive, then the computing cluster 1020 may be disassociated from the submitter of the query. The computing cluster 1020 may then be "scrubbed," such as by removing data associated with the submitter of the queries from memory (e.g. main memory or a cache) or mass storage device (e.g. disk or solid state storage device) utilized by the host computers in the computing cluster 1020. The computing cluster 1020 may then be returned to the warm cluster pool 1010 for use in processing other queries. In some embodiments, some clusters that are inactive might not be disassociated from certain users in certain scenarios. In these scenarios, the user may have a dedicated warm pool of clusters 1010 available for their use.

As indicated at 1060, in some embodiments, resource management service 290 may receive requests to configure resources or a pool of resources. For example, a request to configure a pool of resources may identify a type or size of cluster, a processing engine, machine image, or software to execute for individual clusters in the pool. In some embodiments, the request may indicate a maximum number of resources in the pool, a minimum number of idle resources in the pool, and a maximum number of idle resources in the pool. As indicated at 1070, resource management service may receive a request to configure or specify a pool modification event for a pool, in some embodiments. For example, the pool modification event may be defined according to one or more criteria, such as the minimum number of idle resources, maximum number of idle resources, average job execution time thresholds, pool or resource lifecycle/state conditions, or any other set of one or more criteria that may be evaluated to detect a pool modification event.

Figure 11:
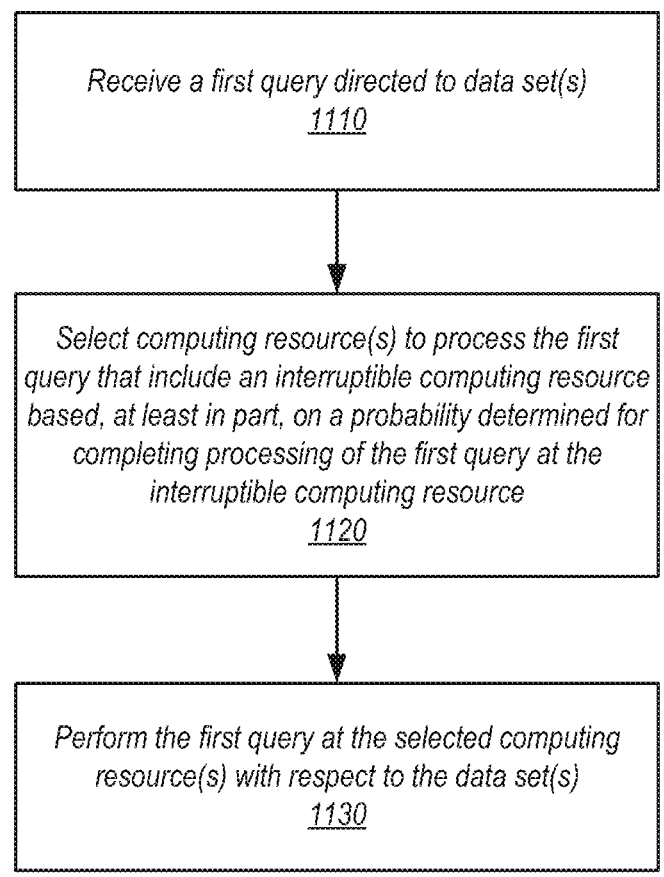
FIG. 11 is a high-level flowchart illustrating various methods and techniques to implement selecting interruptible resources for query execution, according to some embodiments.

Although FIGS. 2-10 have been described and illustrated in the context of a provider network leveraging multiple different services to implement selecting interruptible resources for query execution, the various components illustrated and described in FIGS. 2-10 may be easily applied to other systems, or devices that manage or select resources for query execution from pools of configured resources. As such, FIGS. 2-10 are not intended to be limiting as to other embodiments of a system that may implement selecting interruptible resources for query execution. FIG. 11 is a high-level flowchart illustrating various methods and techniques to implement selecting interruptible resources for query execution, according to some embodiments. Various different systems and devices may implement the various methods and techniques described below, either singly or working together. For example, a managed query service and/or resource management service as described above with regard to FIGS. 2-10 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 1110, a first query directed to data set(s) may be received, in various embodiments. The first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1120, computing resource(s) may be selected to process the first query that include an interruptible computing resource based, at least in part, on a probability determined for computing processing of the first query at the interruptible computing resource, in some embodiments. For example, a historical query model (e.g., such as a model generated according to machine learning techniques) may be maintained that models the performance of queries with different characteristics based on different execution outcomes (e.g., time to complete, cost to complete, resources consumed to complete, probability of failure or timeout, etc.). The historical query model may then be applied, in some embodiments to the query, by comparing features of the query with respect to the features of queries identified in the model, as discussed below with regard to FIG. 12. In some embodiments, the determination of probability for completion may be determined based on the type of query (e.g., a data definition language statement may be classified with a high probability of completion while a data definition language statement in a query may be classified with a lower probability of completion). In some embodiments, a client that submits the query can include in the query a hint or other indicator identifying the time limit or timeframe desired for processing of the query (e.g., 5 minutes or unlimited). In some embodiments, the determination of the probability for completion may be based on upon the likelihood that resource may be interrupted (e.g., the amount of the time that the resource has been available for and executing queries). If for instance, a resource sharing scheme like round-robin scheduling or a cost-based bidding scheme are implemented, then the likelihood that the resource may be interrupted could be estimated based on the features of the sharing schemes (e.g., amount of time before a resource is reassigned or likelihood that a current bid may be outbid).

As indicated at 1130, the first query may be performed at the selected computing resource(s) with respect to the data set(s), in various embodiments. For example, the resource request may be routed to the selected resource in some embodiments. A request to initiate or being processing at the selected computing resource(s) may be performed, in some embodiments, according to an API request or the first query may be initiated by transmitting the query in its original format to the computing resources for execution.

Figure 12:
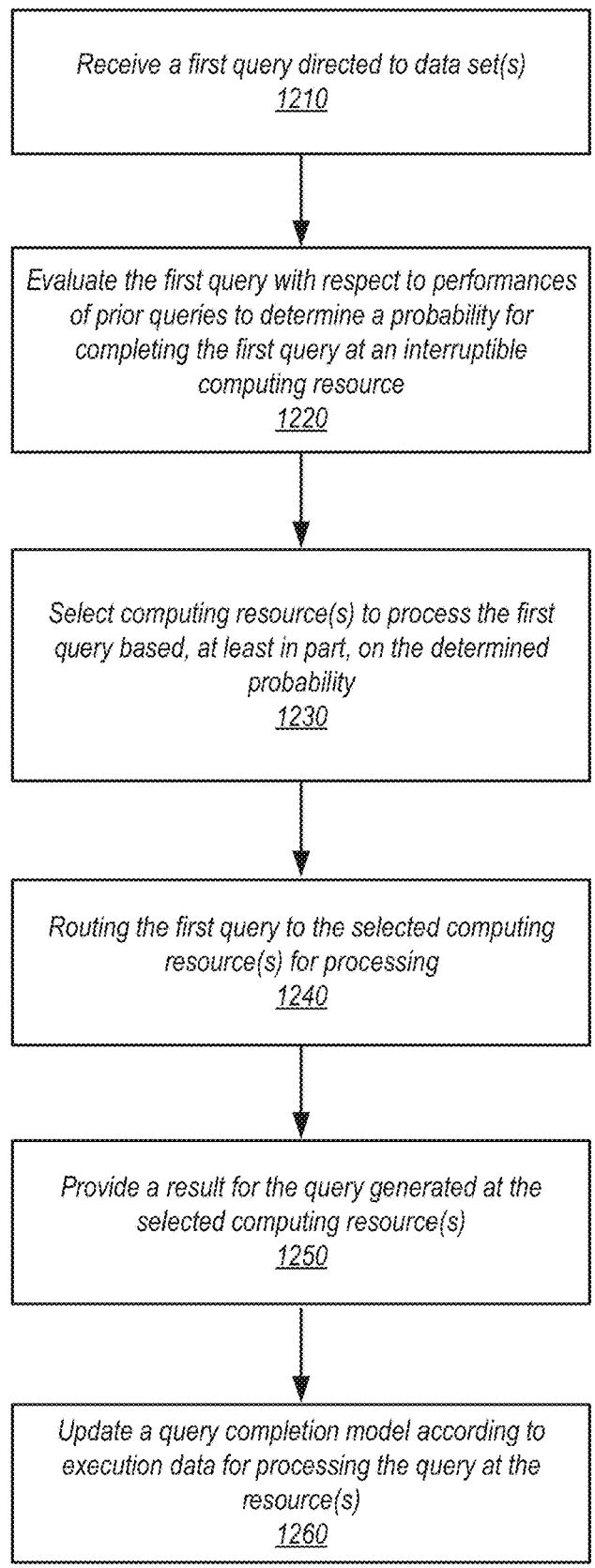
FIG. 12 is a high-level flowchart illustrating various methods and techniques to evaluate a query to determine a completion probability for the query at an interruptible computing resource, according to some embodiments.

FIG. 12 is a high-level flowchart illustrating various methods and techniques to evaluate a query to determine a completion probability for the query at an interruptible computing resource, according to some embodiments. As indicated at 1210, a first query may be received that is directed to data set(s), in various embodiments. The first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits or timeframes (or an indication of no timeframe), or other parameters or properties for configuring the execution of the query, in some embodiments.

As indicated at 1220, the first query may be evaluated with respect to performances of prior queries to determine a probability for completing the first query at an interruptible computing resource, in some embodiments. For example, a determination may be made as to whether the first query is the same or similar to prior query (e.g., by comparing query language or data sources). If so, then the completion time(s) of the same or prior queries may be evaluated according to a desired performance outcome or timeframe (as discussed above). If no similar queries can be found, then a default completion time may be determined (e.g., based on the size of the data set(s) being queried) or further types of similarity analysis or classification may be performed (e.g., using a historical query model as discussed above). A completion time may then be compared to the probability of an interruptible resource being interrupted and/or an amount of time between an indication of an interruption and the occurrence of an interruption (e.g., 5 minutes). A probability measure, risk score, or other completion likelihood classification for the query may then be assigned based on the comparison.

As indicated at 1230, computing resource(s) may be selected to execute the query (that may include interruptible computing resource(s)) based, at least in part, on the determined probability. For example, probability of completion measures may be mapped to different types of computing resources (e.g., 95% or greater chance of completion mapped to all interruptible computing resources, 75% or greater chance of completion mapped to a hybrid or heterogeneous group of computing resources including interruptible computing resources, or less than 75% chance of completion mapped to non-interruptible computing resources). In some embodiments, a mapped category or type of computing resource may not be available, so a category of resource with a next highest likelihood of completion may be selected. For example, if no computing resources that are all interruptible are available for a query with 97% chance of completion, then a hybrid computing resource including some interruptible resource(s) may be selected. In some embodiments, selection of a computing resource may include selection of a pool of resources (of a same interruptibility type), so that the actual resource selected is determined from the available resources in the pool.

As indicated at 1240, the first query may be routed to the selected computing resource(s) for execution, in some embodiments. As indicated at 1250, a result for the query generated at the selected computing resource(s) may be provided, in some embodiments. For example, the results can be sent to a destination or location specified for the query results (e.g., in a client request), in one embodiment. The results may be streamed back or aggregated (e.g., in a data store, like data storage service 230) and provided as a batch (or batches, such as paginated results) via a same interface (e.g., programmatic, graphical, driver, console, etc.) that received the query.

As indicated at 1260, a query completion model may be updated according to execution data for executing the query at the resources, in some embodiments. For example, the memory consumed, processing capacity consumed, number of slots, nodes, or other execution units consumed/utilized, execution plans for prior queries (e.g., including the various types of operations selected by the plan to perform the prior queries), the total execution time to perform the query, a resource or determined cost (e.g., in terms of work or cost units, such as IOPS or monetary units), failure or success indications, interruptions of resource(s) during performance of the query, and/or failure types (e.g., including error codes or exceptions generated) may be included as part of execution data. A supervised learning technique may take the execution data as part of the training set, mapping the performance or results of the query's execution to the features of the query (e.g., query execution plan, source data sets, etc.) in order to train the query completion model to recognize a similar completion probability if a similar query is received.

Figure 13:
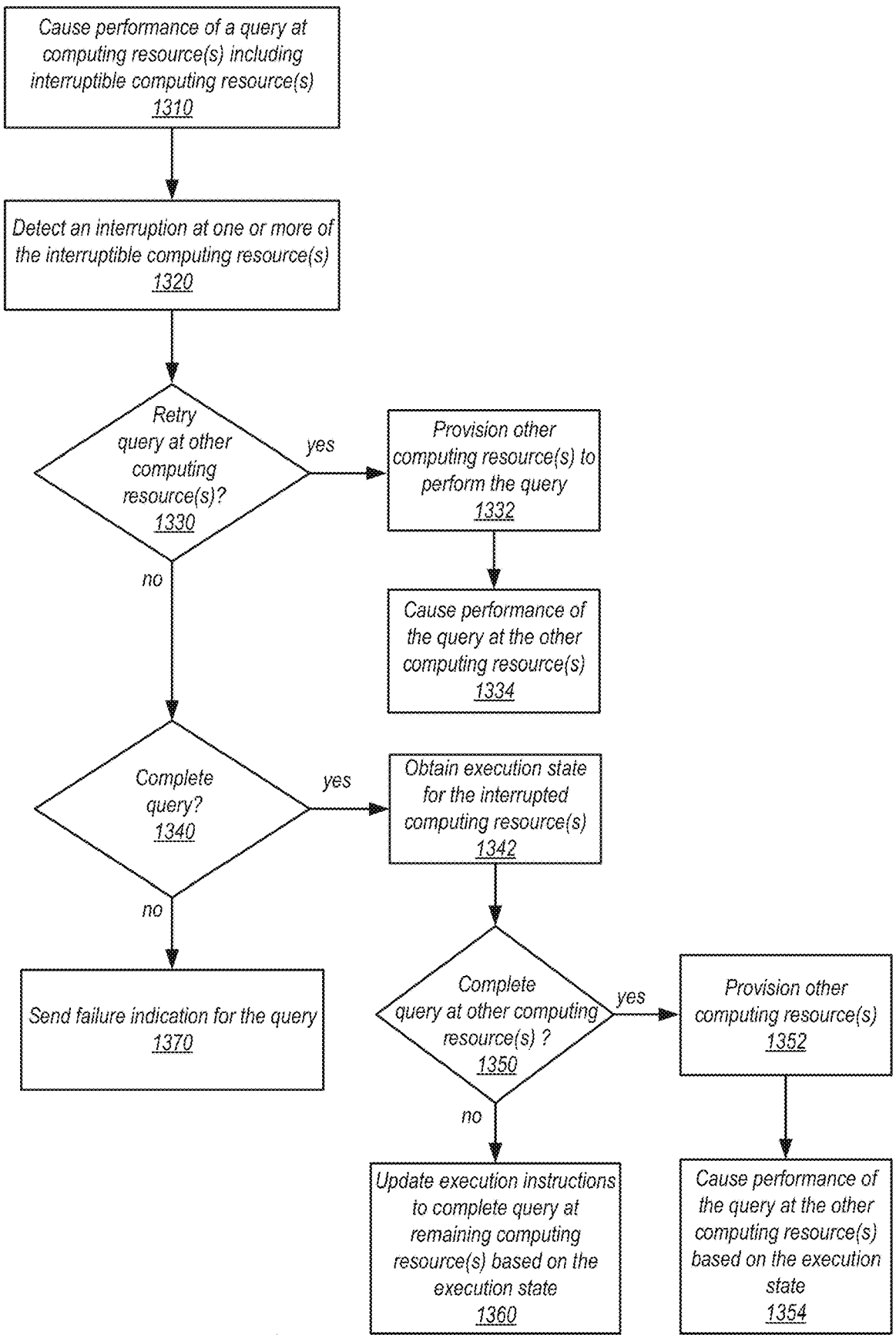
FIG. 13 is a high-level flowchart illustrating various methods and techniques to handle interruptions of interruptible computing resources performing a query, according to some embodiments.

FIG. 13 is a high-level flowchart illustrating various methods and techniques to handle interruptions of interruptible computing resources performing a query, according to some embodiments. As indicated at 1310, performance of a query may be caused at computing resource(s) including interruptible computing techniques, in various embodiments (e.g., according to the techniques discussed above with regard to FIGS. 11 and 12). An interruption at one or more of the interruptible computing resources may be detected, as indicated at 1320. For example, a monitoring agent, such as managed query agent 696 in FIG. 6C, may send a report, message, or other indication identifying the computing resource which may be interrupted (e.g., to perform other processing or otherwise be allocated to a different task, system, or service).

Different types of responses may be determined for an interrupted computing resource. For example, a response type may be dependent on the type of query executing. If the query is classified as a short running query or a query with an estimated time of completion prior to the interruption of the computing resource (e.g., resource interruptions may provide a 2 minute warning before the interruption occurs), then no response or change to the performance of the query may be determined (not illustrated). In some scenarios, however, the query may be unable to complete (or it may be unknown whether the query can complete) prior to the interruption. Thus different response types may be selected.

For example, as indicated at 1330, a determination may be made as to whether the query should be retried at other computing resources, as discussed above with regard to FIG. 5. If, for instance, the remainder of the agreed or promised delivery time for results (e.g., according to a service agreement) or average/expected delivery time for the query is sufficient to perform the query at other computing resource(s) within the delivery time, then the query may be retried at other computing resources, in some embodiments. If, as indicated by the positive exit from 1330, the query is to be retried, other computing resources may be provisioned to perform the query, as indicated at 1332. For example requests to launch, allocate, lease, or otherwise obtain access to perform a query may be submitted to a resource manager, such as discussed above in FIG. 5, in order to provision the other computing resources. Performance of the query may then be caused at the other computing resources, as indicated at 1334, in some embodiments (e.g., by sending or submitting the query to the other embodiments).

In some scenarios, the query may not be retried at other computing resources. For example, the query may be far along in execution (e.g., 90% complete) such that restarting the query would result in greater time and computation loss than completing the query. As indicated at 1340, a determination may be made as to whether the query should be completed, in some embodiments. For example, if the amount of time spent, processing resources consumed, amount of data read, number of operations performed, etc., exceeds some completion threshold(s), then the query may be identified or determined for completion, as indicated by the positive exit from 1340. For queries not identified for completion, as indicated by the negative exit from 1340, a failure indication for the query may be sent, as indicated at 1370, in some embodiments.

For those queries that may be completed, execution state for the interrupted computing resource(s) may be determined, in some embodiments, as indicated at 1342. For example, an execution state cache, tracker, or other data store separate from the interrupted computing resource may maintain the state of the operations to perform the query at the interrupted computing resource. Application data, query execution instructions completed and uncompleted, intermediate results, and/or any other information that may be used to continue or pickup execution of the query from the point in time at which the computing resource was interrupted may be retrieved, in some embodiments.

As indicated at 1350, the query may be completed with other computing resources, in some embodiments. For example, if the interrupted computing resources are the entirety of the computing resources performing the query (or a significant portion of the computing resources executing the query as to leave the remaining resources unable to complete the query within a threshold amount of time), then other computing resources may be added to remaining computing resources or a failover of the query to other computing resources may be performed, in some embodiments. As indicated at 1352, other computing resources may be provisioned, in some embodiments. For example, new compute or worker nodes (e.g., nodes 690 in FIG. 6C) can be provisioned that match the configuration of other nodes that remain in the cluster. A new cluster of nodes can be provisioned (similar to element 1332 discussed above). As indicated at 1354, performance of the query at the other computing resources based on the execution state may be caused, in various embodiments. For example, remaining operations and partial results from the execution state may be provided to the replacement computing nodes along with instructions to complete the operations, in one embodiment. An update to the query execution plan or other change may be performed at a leader or coordinator node (e.g., new or remaining), in some embodiments.

As indicated by the negative exit from 1350, in some embodiments, the query may be completed at remaining computing resources that were not interrupted, as indicated at 1360. For example, execution instructions for the remaining computing resources may be updated to complete the query based on the obtained execution state, in some embodiments. Operations may be reassigned or redistributed to balance the workload amongst remaining computing resources, in some embodiments.

Figure 14:
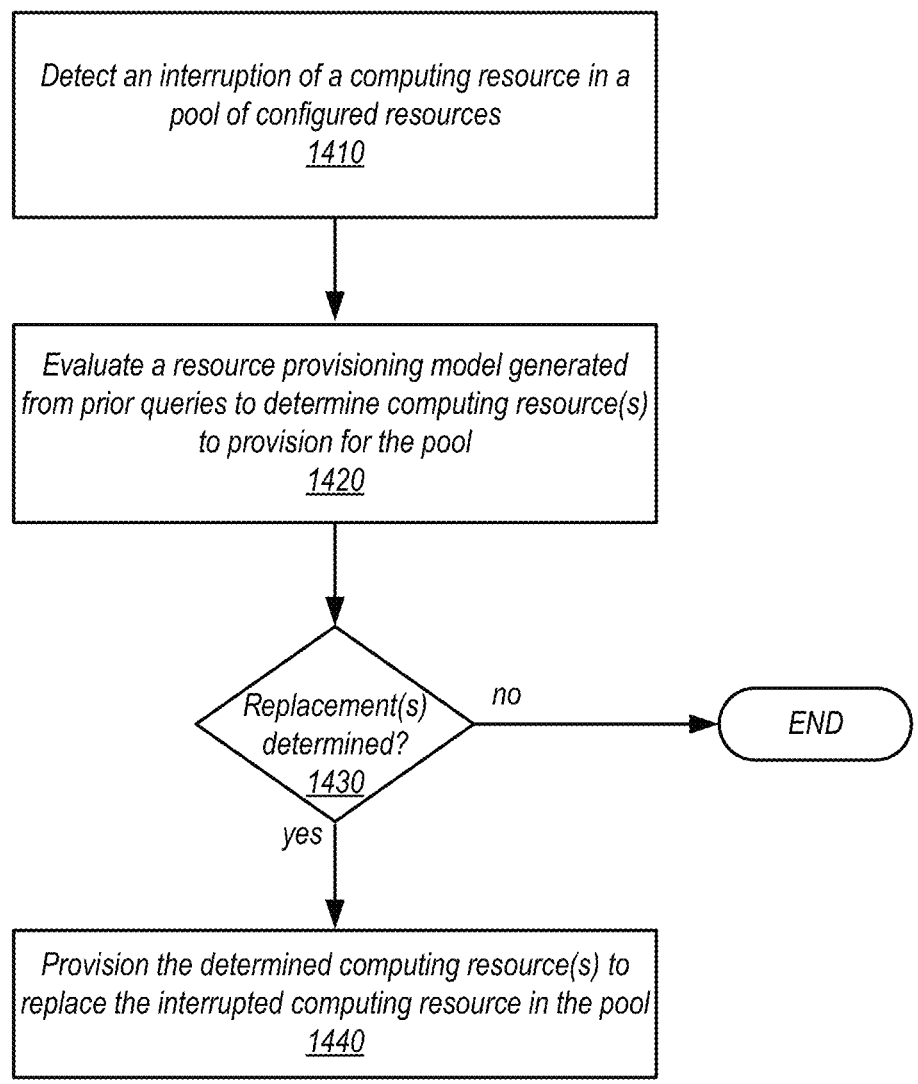
FIG. 14 is a high-level flowchart illustrating various methods and techniques to manage resource pools in the event of an interruption of a computing resource in a pool of configured resources, according to some embodiments.

FIG. 14 is a high-level flowchart illustrating various methods and techniques to manage resource pools in the event of an interruption of a computing resource in a pool of configured resources, according to some embodiments. As indicated at 1410, an interruption of a computing resource in a pool of configured computing resources may be detected, in various embodiments. For example, a monitoring agent, such as managed query agent 696 in FIG. 6C, may send a report, message, or other indication identifying the computing resource which may be interrupted (e.g., to perform other processing or otherwise be allocated to a different task, system, or service). The interrupted computing resource may be an entire cluster or group of computing resources or individual members of a cluster or group of computing resources, in some embodiments. In at least some embodiments, the computing resource may be currently performing a query or may be available (and thus not performing a query).

If the interruption of the computing resource is detected, then a resource provisioning model generated from prior queries to determine computing resource(s) to provision may be evaluated, as indicated at 1420, in various embodiments. For example, the resource provisioning model may be evaluated with respect to resource demand generated by prior patterns or history of received queries to determine whether the demand for resources can accept a percentage of queries that fail or take longer to perform due to resource interruptions. The resource provisioning model may forecast resource demand as well as modeling the likelihood of pool resources being interrupted. Other variables such as the time of day, overall state of resource pool(s), or other information that may alter or inform a provisioning recommendation when evaluating the resource provisioning model, in some embodiments. In some embodiments, resources to be provisioned may be determined according to general classifications, such as small, medium, or large clusters, or may be determined with a specific number of nodes, engine type and engine configuration settings, as well as interruptibility types (e.g., hybrid clusters with some interruptible resources or clusters that only include interruptible resources). In some embodiments, a time-based analysis of the execution of prior queries and interruptions may be performed (e.g., examining demand and resource interruptions as a time series) to predict the demand, and thus number and configuration of resources to include the pool based on a time or time period associated with the interruption of the resource. For instance, an interruption of a computing resource at 8:00 AM EST may evaluate the demand for resources starting at 8:00 AM EST, as well as the mixture of interruptible and non-interruptible resources configuration of the resources used to execute the queries received in order to provision a number of resources that can satisfy a predicted demand for the pool starting at 8:00 AM EST.

If replacement(s) for the interrupted computing resource are determined according to the evaluation, as indicated by the positive exit from 1430, then the determined resource(s) may be provisioned, as indicated at 1440, in some embodiments. For example, requests to other network-based systems or services to launch, create, instantiate, or configure new resources according to the determined computing resources (e.g., non-interruptible resources, hybrid clusters including interruptible resources, or completely interruptible clusters of resources). In some scenarios, no replacements may be determined upon evaluation of the provisioning model, as indicated by the negative exit from 1430. For example, forecasted demand for the pool may be declining and the interrupted computing resource may have been surplus computing capacity in the pool, in some embodiments.

In some embodiments, pools of computing resource(s) configured for query execution may be monitored, in various embodiments, to provisioning individual resources within a pool of computing resources as a result of other provisioning events or failures. For example, as resources are leased, assigned, or otherwise allocated to execute queries, the number of available resources in the pool may decrease. Similarly, resource failures or resource expirations may reduce the number of available resources. If, for example, the number of available resources falls below a maintenance threshold, then a provisioning event may be detected for an existing pool, which may trigger a similar evaluation, determination and provisioning as discussed above with regard to elements 1420, 1430, and 1440. Similar techniques to those described above may be performed to provide a recommendation as to the number and/or configuration of resources to provision for the existing pool in such scenarios.

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 15:
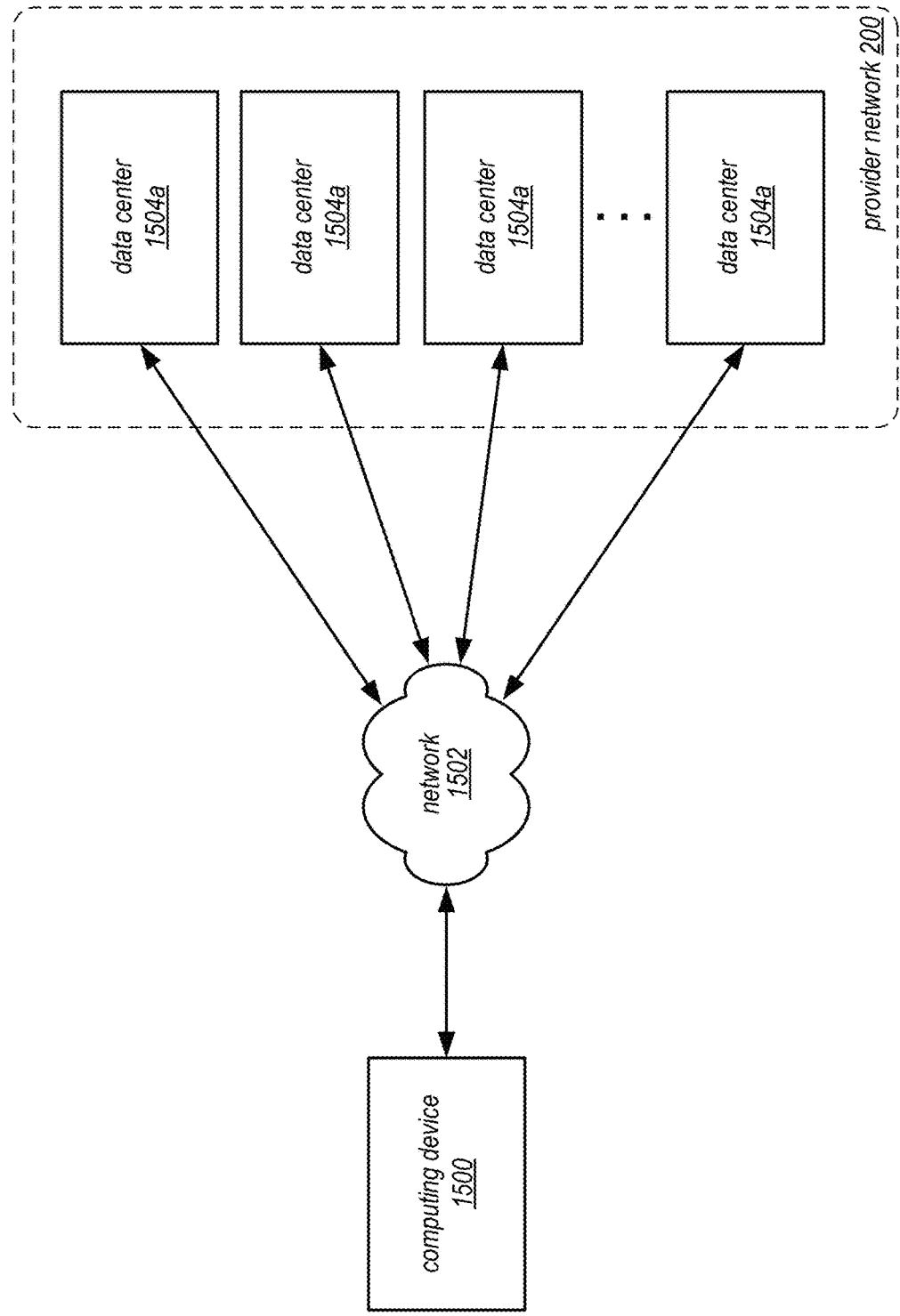
FIG. 15 is a logical block diagram that shows an illustrative operating environment that includes a service provider network that can be configured to implement aspects of the functionality described herein, according to some embodiments.

FIG. 15 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1504A-1504N (which might be referred to herein singularly as "a data center 1504" or in the plural as "the data centers 1504"). The data centers 1504 are facilities utilized to house and operate computer systems and associated components. The data centers 1504 typically include redundant and backup power, communications, cooling, and security systems. The data centers 1504 can also be located in geographically disparate locations. One illustrative configuration for a data center 1504 that can be utilized to implement the technologies disclosed herein will be described below with regard to FIG. 16.

The customers and other users of the service provider network 200 can access the computing resources provided by the service provider network 200 over a network 1502, which can be a wide area communication network ("WAN"), such as the Internet, an intranet or an Internet service provider ("ISP") network or a combination of such networks. For example, and without limitation, a computing device 1500 operated by a customer or other user of the service provider network 200 can be utilized to access the service provider network 200 by way of the network 1502. It should be appreciated that a local-area network ("LAN"), the Internet, or any other networking topology known in the art that connects the data centers 1504 to remote customers and other users can be utilized. It should also be appreciated that combinations of such networks can also be utilized.

Figure 16:
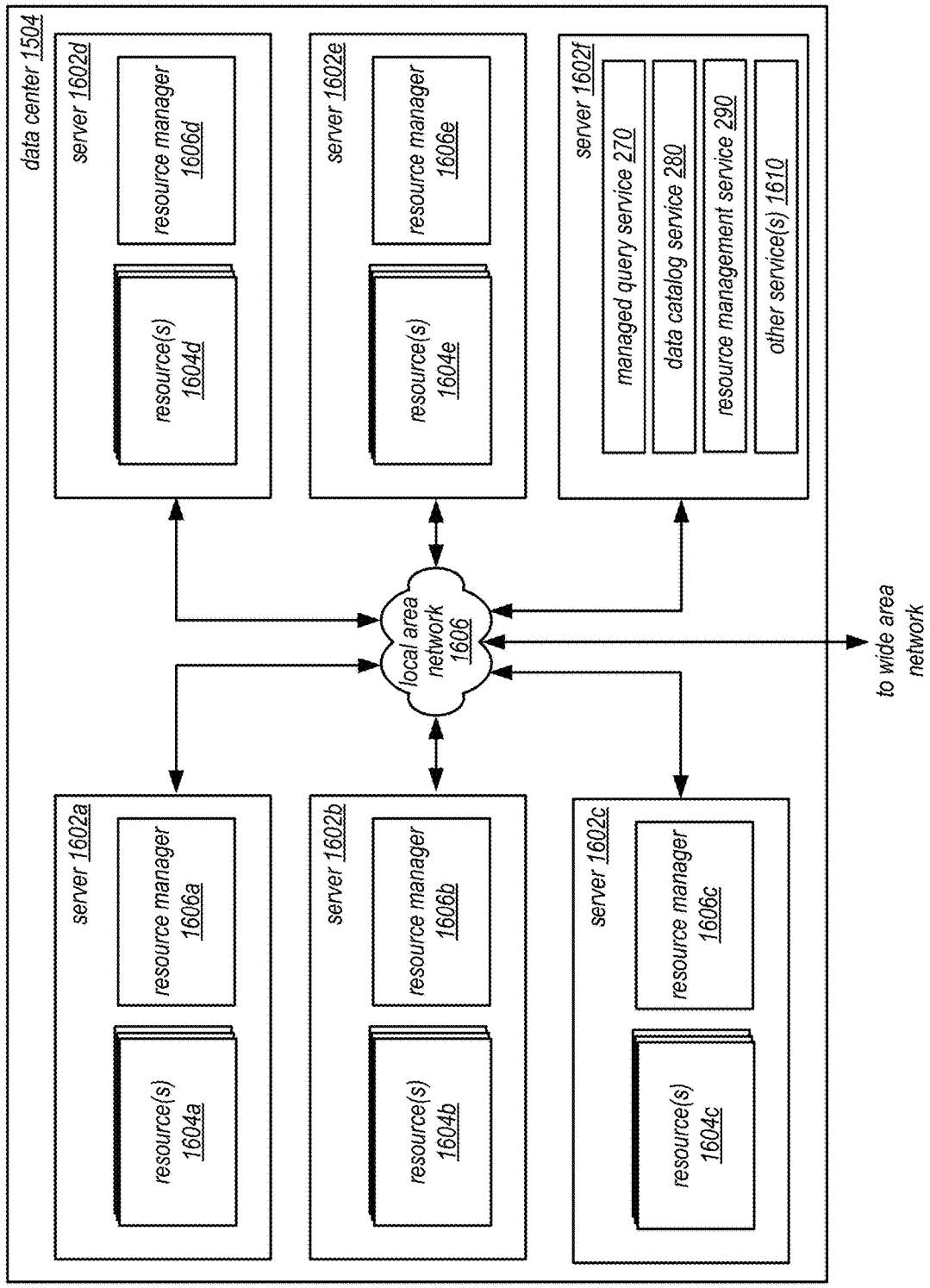
FIG. 16 is a logical block diagram illustrating a configuration for a data center that can be utilized to implement aspects of the technologies disclosed herein, according to some embodiments.

FIG. 16 is a logical block diagram illustrating a configuration for a data center that can be utilized to implement aspects of the technologies disclosed herein, according to various embodiments. is a computing system diagram that illustrates one configuration for a data center 1504 that implements aspects of the technologies disclosed herein for providing managed query execution, such as managed query execution service 270, in some embodiments. The example data center 1504 shown in FIG. 16 includes several server computers 1602A-1602F (which might be referred to herein singularly as "a server computer 1602" or in the plural as "the server computers 1602") for providing computing resources 1604A-1604E.

The server computers 1602 can be standard tower, rack-mount, or blade server computers configured appropriately for providing the computing resources described herein (illustrated in FIG. 16 as the computing resources 1604A-1604E). As mentioned above, the computing resources provided by the provider network 200 can be data processing resources such as VM instances or hardware computing systems, computing clusters, data storage resources, database resources, networking resources, and others. Some of the servers 1602 can also execute a resource manager 1606 capable of instantiating and/or managing the computing resources. In the case of VM instances, for example, the resource manager 1606 can be a hypervisor or another type of program may enable the execution of multiple VM instances on a single server computer 1602. Server computers 1602 in the data center 1504 can also provide network services and other types of services, some of which are described in detail above with regard to FIG. 2.

The data center 1504 shown in FIG. 16 also includes a server computer 1602F that can execute some or all of the software components described above. For example, and without limitation, the server computer 1602F can execute various components for providing different services of a provider network 200, such as the managed query service 270, the data catalog service 280, resource management service 290, and other services 1610 (e.g., discussed above) and/or the other software components described above. The server computer 1602F can also execute other components and/or to store data for providing some or all of the functionality described herein. In this regard, it should be appreciated that the services illustrated in FIG. 16 as executing on the server computer 1602F can execute on many other physical or virtual servers in the data centers 1504 in various configurations.

In the example data center 1504 shown in FIG. 16, an appropriate LAN 1606 is also utilized to interconnect the server computers 1602A-1602F. The LAN 1606 is also connected to the network 1502 illustrated in FIG. 15. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1504A-1504N, between each of the server computers 1602A-1602F in each data center 1504, and, potentially, between computing resources in each of the data centers 1504. It should be appreciated that the configuration of the data center 1504 described with reference to FIG. 16 is merely illustrative and that other implementations can be utilized.

Figure 17:
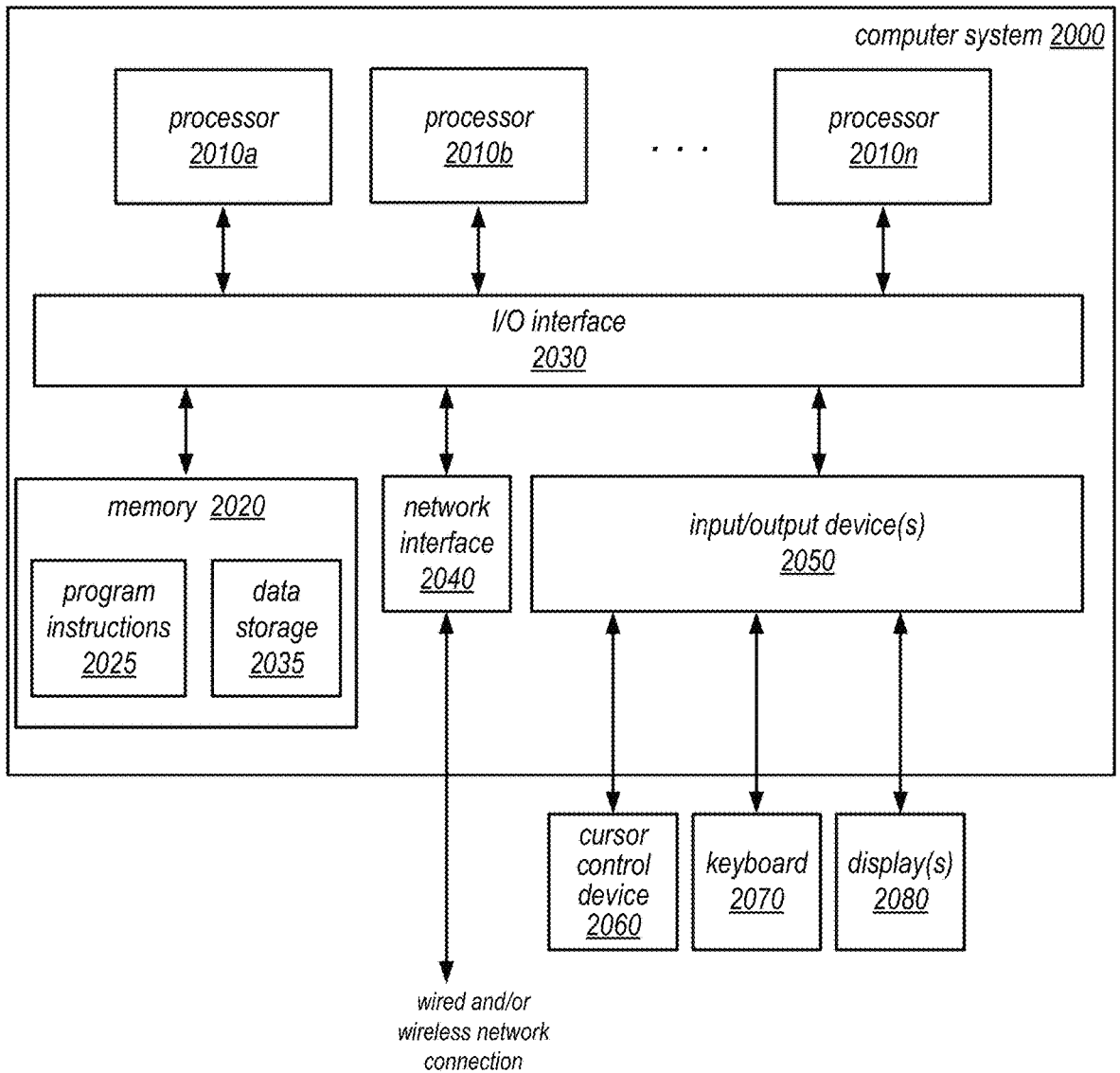
FIG. 17 illustrates an example system configured to implement the various methods, techniques, and systems described herein, according to some embodiments.

Embodiments of selecting interruptible resources for query execution as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to implement a query engine configured to:
receive a first query directed to one or more data sets;
evaluate the first query with respect to respective completion times of prior queries to determine a probability for completing, without interruption, the first query at an interruptible computing resource, the probability based at least in part on a likelihood that the first query is unable to complete due to an interrupt of the interruptible computing resource and an expected completion time of the first query estimated according to the respective completion times of the prior queries;
select one or more computing resources including the interruptible computing resource based, at least in part, on the determined probability compared with a completion probability threshold;
route the first query to the selected computing resources for processing; and
provide a result for the query generated at the selected computing resources.

2. The system of claim 1, wherein to evaluate the first query with respect to the respective completion times of prior queries to determine the probability the query engine is configured to determine that the expected completion time for the first query is less than a guaranteed time for performing queries at the interruptible computing resource.

3. The system of claim 1, wherein the query engine is further configured to:
detect an interruption for the interruptible computing resource while processing the first query; and
select an interrupt handling response to allow completion of the first query at the computing resources based, at least in part, on a determination that the first query can complete prior to an occurrence of the interruption for the interruptible computing resource.

4. The system of claim 1, wherein the query engine is part of a managed query service implemented as part of a provider network, wherein the one or more computing resources are implemented as part of one or more other network-based services in the provider network, wherein the data sets are stored in a data storage service implemented as part of the provider network, and wherein the query is received from a client of the provider network.

5. A method, comprising:
receiving a first query directed to one or more data sets; and
in response to receiving the first query:
selecting one or more computing resources to process the first query that include an interruptible computing resource, wherein the selecting is based, at least in part, on a probability determined for completing, without interruption, processing of the first query at the interruptible computing resource compared with a completion probability threshold, and wherein the probability is based at least in part on a likelihood that the first query is unable to complete due to an interrupt of the interruptible computing resource and an expected completion time of the first query estimated according to respective completion times of prior queries; and
performing the first query at the selected computing resources with respect to the one or more data sets.

6. The method of claim 5, further comprising:
detecting an interruption of the interruptible computing resource during the performance of the first query;
obtaining an execution state for the interruptible computing resource for the performance of the first query; and
causing performance of the first query to be completed at one or more other computing resources instead of the interruptible computing resource based, at least in part, on the execution state for the interruptible computing resource.

7. The method of claim 5, wherein the computing resources are implemented as part of a compute cluster, and wherein the method further comprises:
selecting one or more other compute clusters to perform the first query; and
performing the first query at the one or more other compute clusters.

8. The method of claim 5, wherein selecting one or more computing resources to process the first query is further based on a timeframe specified for completing execution of the first query provided by a submitter of the first query.

9. The method of claim 5, further comprising:
receiving a second query directed to the data sets;
in response to receiving the second query:
selecting one or more non-interruptible computing resources to process the second query based, at least in part, on a probability determined for completing processing of the second query at another interruptible computing resource; and
performing the second query at the selected non-interruptible computing resources with respect to the data sets.

10. The method of claim 5, wherein the one or more computing resources only include interruptible computing resources.

11. The method of claim 5, further comprising:
detecting an interruption for the interruptible computing resource while processing the first query; and
selecting an interrupt handling response to allow completion of the first query at the computing resources based, at least in part, on a determination that the first query can complete prior to an occurrence of the interruption for the interruptible computing resource.

12. The method of claim 5, wherein the computing resources are implemented as part of a larger collection of computing resources in a pool of computing resources that include other interruptible computing resources, and wherein the method further comprises:
detecting an interruption of one of the other interruptible computing resources;
evaluating a resource provisioning model generated from the performance of prior queries to determine one or more replacement computing resources for the pool, wherein the one or more replacement resources for the pool are interruptible; and
provisioning the replacement resources for the pool.

13. The method of claim 5, wherein selecting one or more computing resources to process the first query comprises determining that the expected completion time for the first query is less than a guaranteed time for performing queries at the interruptible computing resource.

14. A non-transitory, computer-readable storage medium, storing program instructions that when executed by one or more computing devices cause the one or more computing devices to implement:
  receiving a first query directed to one or more data sets;
  in response to receiving the first query:
    evaluating the first query to determine a probability for completing, without interruption, the first query at an interruptible computing resource, the probability based at least in part on a likelihood that the first query is unable to complete due to an interrupt of the interruptible computing resource and an expected completion time of the first query estimated according to respective completion times of prior queries;
    selecting one or more computing resources to process the first query that include the interruptible computing resource based, at least in part, on a comparison of the determined probability with a completion probability threshold; and
    performing the first query at the selected computing resources with respect to the one or more data sets.

15. The non-transitory, computer-readable storage medium of claim 14, wherein the program instructions cause the one or more computing devices to implement:
  detecting an interruption of the interruptible computing resource during the performance of the first query; and
  performing the first query at one or more other computing resources instead of the interruptible computing resource.

16. The non-transitory, computer-readable storage medium of claim 14, wherein the program instructions cause the one or more computing devices to implement:
  detecting an interruption of the interruptible computing resource during the performance of the first query;
  obtaining an execution state for the interruptible computing resource for the performance of the first query; and
  causing performance of the first query to be completed at one or more other computing resources instead of the interruptible computing resource based, at least in part, on the execution state for the interruptible computing resource.

17. The non-transitory, computer-readable storage medium of claim 14, wherein the one or more computing resources include at least one non-interruptible computing resource.

18. The non-transitory, computer-readable storage medium of claim 14, wherein the computing resources are implemented as part of a larger collection of computing resources in a pool of computing resources that include other interruptible computing resources, and wherein the program instructions cause the one or more computing devices to further implement:
  detecting an interruption of one of the other interruptible computing resources; and
  evaluating a resource provisioning model generated from the performance of prior queries to determine that no replacement computing resource is needed for the interrupted computing resource.

19. The non-transitory, computer-readable storage medium of claim 14, wherein selecting the one or more computing resources to process the first query is further based on a timeframe specified for completing execution of the first query provided by a submitter of the first query.

20. The non-transitory, computer-readable storage medium of claim 14, wherein the evaluating and the selecting is performed by a managed query service implemented as part of a provider network, wherein the one or more computing resources are implemented as part of one or more other network-based services in the provider network, wherein the data sets are stored in a data storage service implemented as part of the provider network, and wherein the query is received from a client of the provider network.

* * * * *